United States Patent
Hori et al.

(10) Patent No.: US 12,489,332 B2
(45) Date of Patent: Dec. 2, 2025

(54) MOTOR AND COMPRESSOR

(71) Applicants: AICHI ELECTRIC CO., LTD., Kasugai (JP); KABUSHIKI KAISHA TOYOTA JIDOSHOKKI, Kariya (JP)

(72) Inventors: Takashi Hori, Kasugai (JP); Shoji Mano, Kasugai (JP); Yudai Suzuki, Kasugai (JP); Kensuke Ikai, Kariya (JP); Taku Adaniya, Kariya (JP); Shuji Takimoto, Kariya (JP)

(73) Assignees: AICHI ELECTRIC CO., LTD., Kasugai (JP); KABUSHIKI KAISHA TOYOTA JIDOSHOKKI, Kariya (JP)

( * ) Notice: Subject to any disclaimer, the term of this patent is extended or adjusted under 35 U.S.C. 154(b) by 286 days.

(21) Appl. No.: 18/145,998

(22) Filed: Dec. 23, 2022

(65) Prior Publication Data
US 2023/0208240 A1 Jun. 29, 2023

(30) Foreign Application Priority Data
Dec. 27, 2021 (JP) .................. 2021-213546

(51) Int. Cl.
*H02K 3/51* (2006.01)
*F04C 11/00* (2006.01)
(Continued)

(52) U.S. Cl.
CPC .............. *H02K 3/51* (2013.01); *F04C 11/008* (2013.01); *F04C 15/008* (2013.01); *H02K 3/12* (2013.01)

(58) Field of Classification Search
CPC .... F04C 11/008; F04C 15/008; F04C 23/008; F04C 23/02; F04C 29/0085;
(Continued)

(56) References Cited

U.S. PATENT DOCUMENTS 4,603,273 A 7/1986 McDonald
6,992,417 B1 1/2006 Yamada
(Continued)

FOREIGN PATENT DOCUMENTS

CN 114123593 A 3/2022
JP S63299734 A 12/1988
(Continued)

OTHER PUBLICATIONS

Unpublished U.S. Appl. No. 17/691,707.
(Continued)

*Primary Examiner* — Christopher M Koehler
*Assistant Examiner* — Ethan Nguyen Vo
(74) *Attorney, Agent, or Firm* — J-TEK LAW PLLC; Jeffrey D. Tekanic; Scott T. Wakeman

(57) ABSTRACT

A motor includes a rotor and a stator, the stator having a stator core and an electrical insulator assembly at each end of the stator core. The electrical insulator assemblies each have an outer wall part extending in a circumferential direction and facing a yoke of the stator core and a plurality of extending parts extending radially inward from the outer wall part and facing teeth of the stator core. The outer wall part has a radial thickness and includes a plurality of radial notches for guiding extensions of the stator winding between an inner peripheral surface and an outer peripheral surface of the outer wall part. The outer peripheral surface of the outer wall part adjacent to the notches is configured such that the radial thickness of the outer wall part gradually decreases toward the notch along a circumferential direction of the yoke.

20 Claims, 24 Drawing Sheets

(51) Int. Cl.
*F04C 15/00* (2006.01)
*H02K 3/12* (2006.01)

(58) Field of Classification Search
CPC ........ H02K 15/0068; H02K 3/12; H02K 3/34; H02K 3/51; H02K 3/522
See application file for complete search history.

(56) References Cited

U.S. PATENT DOCUMENTS

| | | | |
|---|---|---|---|
| 7,078,835 | B2 | 7/2006 | Gross et al. |
| 7,906,879 | B2 | 3/2011 | Jang et al. |
| 8,067,867 | B2 | 11/2011 | Ueta et al. |
| 8,432,082 | B2 | 4/2013 | Fukunaga et al. |
| 8,450,898 | B2 | 5/2013 | Sears et al. |
| 8,608,462 | B2 | 12/2013 | Taema |
| 10,374,479 | B2 | 8/2019 | Lee et al. |
| 12,062,963 | B2 | 8/2024 | Suzuki et al. |
| 12,088,164 | B2 | 9/2024 | Hasegawa et al. |
| 12,149,138 | B2 | 11/2024 | Hasegawa et al. |
| 2004/0252001 | A1 | 12/2004 | Yamada et al. |
| 2006/0033395 | A1 | 2/2006 | Izumi et al. |
| 2006/0181167 | A1 | 8/2006 | Bradfield et al. |
| 2007/0200450 | A1 | 8/2007 | Yukitake |
| 2010/0026117 | A1 | 2/2010 | Sakata |
| 2011/0309711 | A1 | 12/2011 | Brown |
| 2013/0193800 | A1 | 8/2013 | Yokogawa |
| 2015/0035404 | A1 | 2/2015 | Taema |
| 2015/0280508 | A1 | 10/2015 | Hirota et al. |
| 2015/0303759 | A1 | 10/2015 | Nishikawa et al. |
| 2015/0349611 | A1 | 12/2015 | Hino et al. |
| 2016/0020659 | A1 | 1/2016 | Takahashi |
| 2017/0222513 | A1 | 8/2017 | Lee et al. |
| 2017/0302130 | A1 | 10/2017 | Yamada et al. |
| 2019/0074735 | A1 | 3/2019 | Shono et al. |
| 2019/0305626 | A1 | 10/2019 | Miyata et al. |
| 2020/0119600 | A1 | 4/2020 | Inuzuka |
| 2020/0313485 | A1* | 10/2020 | Watanabe ................ H02K 3/12 |
| 2021/0013751 | A1 | 1/2021 | Naka et al. |
| 2021/0050757 | A1 | 2/2021 | Kitano et al. |
| 2021/0320539 | A1* | 10/2021 | Kamogi ................. H02K 1/148 |
| 2021/0344243 | A1* | 11/2021 | Koga ................ H02K 15/0081 |
| 2021/0351637 | A1* | 11/2021 | Chung .................. H02K 5/225 |
| 2021/0384790 | A1* | 12/2021 | Echizen .................. H02K 3/28 |
| 2022/0045569 | A1* | 2/2022 | Hasegawa ............... H02K 3/30 |
| 2022/0320939 | A1* | 10/2022 | Naito ..................... H02K 7/003 |
| 2023/0208231 | A1 | 6/2023 | Suzuki et al. |
| 2023/0208242 | A1 | 6/2023 | Suzuki et al. |
| 2023/0208243 | A1 | 6/2023 | Hori et al. |
| 2023/0291265 | A1 | 9/2023 | Hasegawa et al. |
| 2023/0307976 | A1 | 9/2023 | Hasegawa et al. |

FOREIGN PATENT DOCUMENTS

| | | |
|---|---|---|
| JP | H09308166 A | 11/1997 |
| JP | 2002171704 A | 6/2002 |
| JP | 2002272045 A | 9/2002 |
| JP | 2006074943 A | 3/2006 |
| JP | 2006115565 A | 4/2006 |
| JP | 2006296146 A | 10/2006 |
| JP | 2008042959 A | 2/2008 |
| JP | 2008092700 A | 4/2008 |
| JP | 2008278604 A | 11/2008 |
| JP | 2010279218 A | 12/2010 |
| JP | 2012016100 A | 1/2012 |
| JP | 2012055098 A | 3/2012 |
| JP | 2014128049 A | 7/2014 |
| JP | 2015047072 A | 3/2015 |
| JP | 2015133808 A | 7/2015 |
| JP | 2015208138 A | 11/2015 |
| JP | 2016001947 A | 1/2016 |
| JP | 2016072997 A | 5/2016 |
| JP | 2016195488 A | 11/2016 |
| JP | 2016195489 A | 11/2016 |
| JP | 2016200122 A | 12/2016 |
| JP | 2016220400 A | 12/2016 |
| JP | 2017085756 A | 5/2017 |
| JP | 2017184400 A | 10/2017 |
| JP | 2017184401 A | 10/2017 |
| JP | 2018108018 A | 7/2018 |
| JP | 2018153056 A | 9/2018 |
| JP | 2018153057 A | 9/2018 |
| JP | 2018153058 A | 9/2018 |
| JP | 2019004599 A | 1/2019 |
| JP | 2019030158 A | 2/2019 |
| JP | 2019180170 A | 10/2019 |
| JP | 2019180171 A | 10/2019 |
| JP | 2020022247 A | 2/2020 |
| JP | 2020072579 A | 5/2020 |
| JP | 2020162316 A | 10/2020 |
| JP | 2021013271 A | 2/2021 |
| JP | 2021013272 A | 2/2021 |
| WO | 2017175358 A1 | 10/2017 |
| WO | 2022009521 A1 | 1/2022 |

OTHER PUBLICATIONS

Unpublished U.S. Appl. No. 17/930,870.
Unpublished U.S. Appl. No. 17/931,960.
Unpublished U.S. Appl. No. 18/145,982.
Unpublished U.S. Appl. No. 18/145,993.
Office Action from the Korean Patent Office issued on Feb. 21, 2024 in related application No. KR10-2022-0153021, and machine translation thereof.
Office Action from the Korean Patent Office issued on Feb. 22, 2024 in related application No. KR10-2022-0153020, and machine translation thereof.
Office Action mailed Feb. 16, 2024, in related U.S. Appl. No. 17/691,707, and examined claims 1-20.
Office Action mailed Feb. 19, 2025, in related U.S. Appl. No. 18/145,982, and examined claims 1-13.
Office Action mailed Jun. 12, 2024, in related U.S. Appl. No. 17/930,870, and examined claims 1-10.
Office Action mailed Mar. 7, 2025, in related U.S. Appl. No. 18/145,993, and examined claims 1-8.
Office Action from the Japanese Patent Office issued on Sep. 2, 2025 in counterpart JP application No. 2021-213546 and machine translation thereof.

* cited by examiner

MOTOR AND COMPRESSOR

CROSS-REFERENCE

This application claims priority to Japanese patent application no. 2021-213546 filed on Dec. 27, 2021, the contents of which are fully incorporated herein by reference.

TECHNICAL FIELD

The present disclosure generally relates to a motor and a compressor using the same as a driving source.

BACKGROUND ART

In so-called eco-friendly cars such as hybrid vehicles (HV), electric vehicles (EV) and fuel cell vehicles (FCV), a compressor (which may be referred to as an "electric compressor") in which a compression mechanism is driven by a motor is used as a compressor for an air conditioner.

Recently, along with an increase of the power supply voltage of vehicles, motors of high-pressure specifications are also desired to be used in electric compressors. For example, a technique for ensuring a minimum electrical insulation distance between parts, or a technique for preventing contact between parts is desired to be developed.

A motor (a so-called "concentrated winding motor") having a stator (a so-called "concentrated winding stator") in which electrical insulation assemblies are arranged on stator core end surfaces on both sides of the stator core in an axial direction, respectively, and in which a lead wire forming a stator winding is wound around a tooth of the stator core, has been used as a motor for driving a compression mechanism. The lead wire is constituted, for example, by a copper or aluminum conductor and an insulation film covering an outer periphery of the conductor.

Generally, a stator winding is formed by a plurality of phases of stator winding portions, such as star-connected or delta-connected first to third phases (U-, V- and W-phases) of stator winding portions. The stator winding portions include a plurality of winding portions connected in series or in parallel. Each of the winding portions has a winding part wound around a tooth and a pair of extensions (a first extension and a second extension) extending continuously from both ends of the winding part.

An extension of one of a pair of the winding parts is continuously connected to an extension of the other winding part, and the extensions form a crossover wire for connecting the two winding parts.

The electrical insulator assembly has an outer wall part extending in a circumferential direction. The outer wall part has a plurality of notches in which the crossover wire is guided. For example, the crossover wire is drawn from the inside to the outside of the outer wall part via any one of the notches and guided along the outer peripheral surface of the outer wall part and then drawn back from the outside to the inside of the outer wall part via another notch.

Such a technique for guiding a crossover wire is disclosed, for example, in Japanese Unexamined Patent Application Publication No. 2020-162316.

The crossover wire may project outward of the outer wall part when drawn back from the outside to the inside of the outer wall part. If the crossover wire projects outward of the outer wall part, the insulation distance between the crossover wire and other parts adjacent to the electrical insulator assembly may be shortened, or the crossover wire may come into contact with other parts.

In the above-mentioned known motor, a projection is provided on the outer wall part of the electrical insulator assembly in order to suppress outward projection of the crossover wire.

In this known motor, however, it is necessary to provide the projection on the outer wall part of the electrical insulator assembly.

SUMMARY

Accordingly, it is one non-limiting aspect of the present disclosure to provide a technique for suppressing outward projection of extensions extending from a winding part outward of an outer wall part of an electrical insulator assembly. This (suppressing outward projection of the extensions outward of the outer wall part of the electrical insulator assembly) also suppresses outward projection of a crossover wire formed by two extensions of the respective winding parts.

A first aspect of the present disclosure relates to a motor.

The motor of the present disclosure comprises a stator and a rotor that is rotatable relative to the stator. Known rotors of various configurations can be used as the rotor.

The stator has a stator core, a plurality of electrical insulator assemblies and a stator winding.

The stator core is formed, for example, of a lamination of electromagnetic steel sheets. The stator core has a yoke extending annularly around an axis of the stator core and a plurality of teeth extending radially inward from the yoke.

The electrical insulator assemblies include a first electrical insulator assembly arranged on a first stator core end surface on a first side of the stator core in an axial direction and a second electrical insulator assembly arranged on a second stator core end surface on a second side of the stator core in the axial direction. Each of the first electrical insulator assembly and the second electrical insulator assembly has an outer wall part and a plurality of extending parts. The outer wall part extends in a circumferential direction and is arranged to face the yoke. The extending parts extend radially inward from the outer wall part and each of the extending parts is arranged to face the tooth.

The stator winding is formed by a plurality of winding phases, Each of the winding phases has a plurality of winding portions. Each of the winding portions has a winding part wound around the tooth of the stator core and the extending parts of the first electrical insulator assembly and the second electrical insulator assembly and a pair of extensions continuously extending from a first end and a second end of the winding part, respectively.

The outer wall part has a prescribed radial thickness and has an inner peripheral surface and an outer peripheral surface. The outer wall part has a plurality of notches extending radially therethrough and configured to guide the extensions between the inner peripheral surface and the outer peripheral surface.

Further, the outer wall part is notched from the outer peripheral surface side such that the radial thickness gradually decreases toward the notch along a circumferential direction of the yoke of the stator core. The notch may just be formed in the electrical insulator assembly on which the extensions are guided. In other words, the notches may be provided only where an extension needs to pass through the outer wall part.

The motor of this disclosure can suppress, with a simple structure, outward projection of the extensions extending from the winding part outward of the outer wall part of the electrical insulator assembly.

In another embodiment of the motor of this disclosure, the stator has a cover that is removably mounted onto at least one of the first electrical insulator assembly and the second electrical insulator assembly.

The cover has an outer peripheral wall, an inner peripheral wall and a bottom wall. The outer peripheral wall extends in the circumferential direction and is arranged outside of the outer peripheral surface of the outer wall part. The inner peripheral wall extends in the circumferential direction and is arranged to face the inner peripheral surface of the outer peripheral wall in the radial direction. The bottom wall connects the outer peripheral wall and the inner peripheral wall.

The cover is mounted onto the electrical insulator assembly such that part of the winding part is covered by the bottom wall on the outside of the inner peripheral wall in the radial direction, while another part of the winding part is exposed on the inside of the inner peripheral wall in the radial direction.

Axial movement of the extensions extending from the winding part is restricted by the cover.

In this embodiment, movement of the extensions along the axial direction can be suppressed.

In another embodiment of the motor of this disclosure, the bottom wall has a through hole formed therethrough in the axial direction.

In this embodiment, a temperature rise within the cover can be suppressed.

In another embodiment of the motor of this disclosure, an interphase insulation member is provided between the winding parts of different winding phases adjacent to each other, within a slot defined between the teeth adjacent to each other.

Movement of the interphase insulation member toward the at least one electrical insulator assembly in the axial direction is restricted by the inner peripheral wall of the cover.

In this embodiment, the length of the interphase insulation member on the at least one electrical insulator assembly side can be increased so that the insulation distance on the at least one electrical insulator assembly side can be increased.

In this embodiment, the electrical insulating properties of the interphase insulation member along the axial direction can be enhanced.

In another embodiment of the motor of this disclosure, the winding part is wound from the outer wall side of one of the first electrical insulator assembly and second electrical insulator assembly. Thus, one of the pair of the extensions is a winding start wire that extends continuously to the winding part on the outer wall side of the one electrical insulator assembly.

At least one of the winding start wires is covered with an insulation tube and is drawn out from the inner peripheral surface side to the outer peripheral surface side of the outer wall part via one of the notches and then drawn back from the outer peripheral surface side to the inner peripheral surface side of the outer wall part via another one of the notches. The drawn-back winding start wire and the insulation tube are arranged to overlap with the winding part in the axial direction.

In this embodiment, the winding start wire covered with the insulation tube can be passed to the outside of the outer wall part so that the insulation distance from the winding start wire can be ensured when the winding part is wound.

In this embodiment, the insulation strength can be enhanced.

In another embodiment of the motor of this disclosure, the stator winding is formed by a first winding phase to a third winding phase which are star-connected.

A neutral point of the first winding phase to the third winding phase is covered with an insulation member. The insulation member covering the neutral point is mounted to the insulation tube covering the winding start wire.

In this embodiment, damage to other parts due to movement of the neutral point can be prevented.

In another embodiment of the motor of this disclosure, the stator winding is formed by a first winding phase to a third winding phase which are star-connected.

A neutral point of the first winding phase to the third winding phase is covered with an insulation member. The insulation member covering the neutral point is arranged between the winding portions adjacent to each other.

Where an interphase insulation member is arranged between the winding parts of different phases that are respectively wound around the two adjacent teeth, the insulation member covering the neutral point may be arranged in the interphase insulation member.

In this embodiment, damage to other parts due to movement of the neutral point can be prevented.

A second aspect of the present disclosure relates to a compressor.

The compressor of this disclosure has a compression mechanism for compressing refrigerant and a motor for driving the compression mechanism. Any one of the motors described above in the first aspect is used as the motor.

Known compression mechanisms of various configurations can be used as the compression mechanism for compressing refrigerant.

The compressor of this disclosure has the same effect as any one of the above-described motors of the first aspect.

By using the motor and the compressor of the present disclosure, outward projection of the crossover wire outward of the outer wall part of the electrical insulator assembly is suppressed with a simple structure.

DETAILED DESCRIPTION OF THE EMBODIMENTS

A representative embodiment according to the present disclosure is now described with reference to the drawings.

In this description, the term "axial direction" refers to an extending direction (x direction shown in the Figures) of an axis P of a stator core. The axis P of the stator core corresponds to a rotation center line of a rotor when the rotor is arranged to be rotatable relative to a stator. Further, the side shown by arrow x1 in the Figures (e.g. upper side in FIGS. 1 and 2) and the side shown by arrow x2 in the Figures (e.g. lower side in FIGS. 1 and 2) are defined as a "first side in the axial direction" and a "second side in the axial direction", respectively.

The term "circumferential direction" refers to a circumferential direction (z direction shown in the Figures) around the axis P as viewed from the first or second side in the axial direction. Further, in the circumferential direction around the axis P, as viewed from the first side in the axial direction, the clockwise side (shown by arrow "z1" in the Figures) and the counterclockwise side (shown by arrow "z2" in the Figures) are defined as a "first side in the circumferential direction" and a "second side in the circumferential direction", respectively.

The terms "radially" and "radial direction" refer to an extending direction (y direction shown in the Figures) of a line passing through the axis P as viewed from the first or second side in the axial direction. Further, in the radial direction, the side of the axis P (shown by arrow "y1" in the Figures) and the other side opposite from the axis P (shown by arrow "y2" in the Figures) are defined as the "inside in the radial direction" or a "first side in the radial direction", and the "outside in the radial direction" or a "second side in the radial direction", respectively.

As for electrical insulator assemblies (first and second electrical insulator assemblies), slot insulation members, interphase insulation members and a cover, the terms "axial direction", "circumferential direction" and "radial direction" respectively refer to the "axial direction", "circumferential direction" and "radial direction" in the state in which each is mounted on the stator core.

The "first side in the axial direction" and the "second side in the axial direction", or the "first side in the circumferential direction" and the "second side in the circumferential direction" may be used in reverse.

Although an aspect of the present disclosure is to suppress outward projection of extensions extending from both ends of a winding part, outward of an outer wall part of an electrical insulator assembly, for easier understanding, a method of processing extensions and a method of processing crossover wires formed by the extensions are described in the following description.

Figure 1:
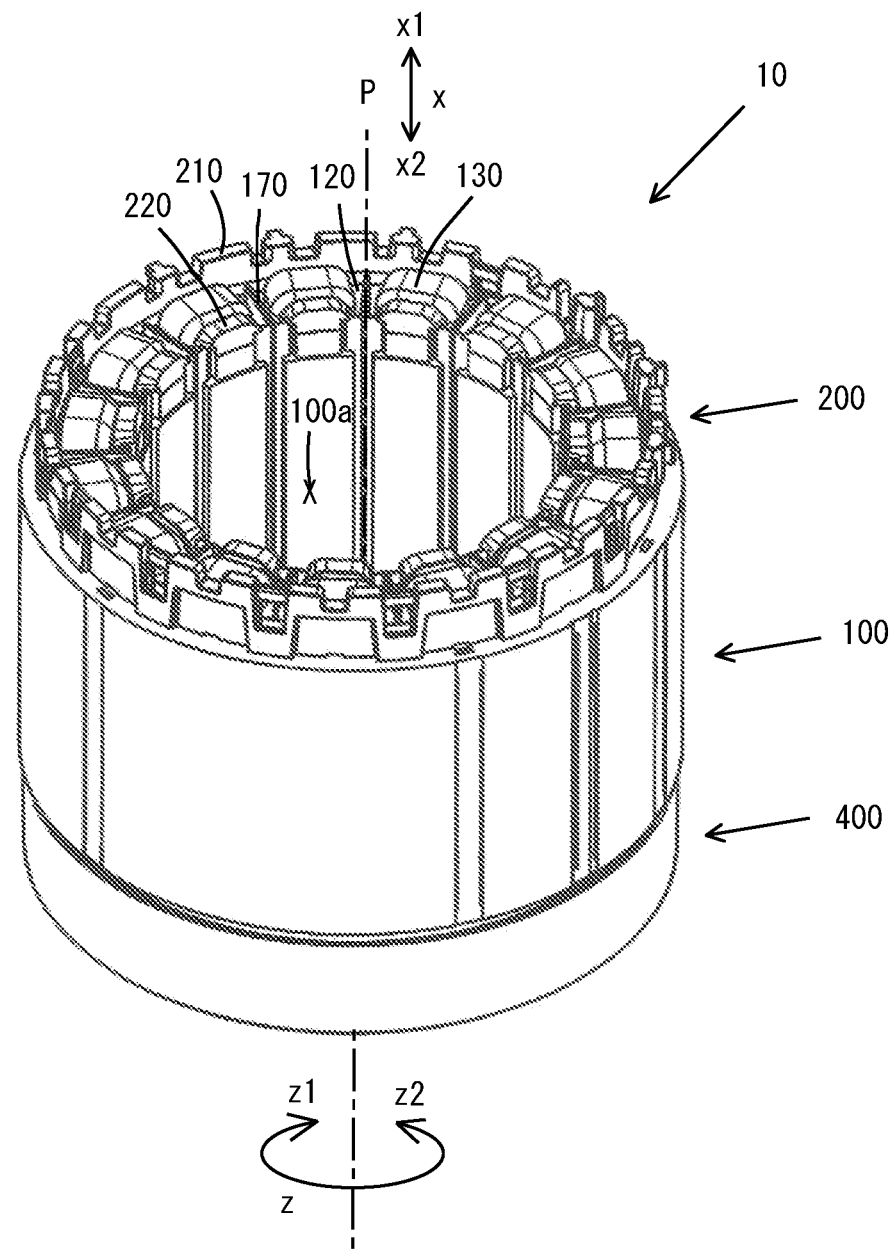
FIG. 1 is a perspective view of a stator for a motor according to a first embodiment of the present disclosure.

A stator 10 that forms a motor according a first embodiment of the present disclosure is now described with reference to FIGS. 1 and 2.

The stator 10 includes a stator core 100, a first electrical insulator assembly 200, a second electrical insulator assembly 300, slot insulation members 120, stator windings (coils) 130, interphase insulation members 170 and a cover 400.

The stator core 100 is formed of a stack of a plurality of electromagnetic steel sheets (laminations).

The stator core 100 has a tubular shape and has a stator core end surface (first stator core end surface) 100A and a stator core end surface (second stator core end surface) 100B respectively on the first side and the second side in the axial direction.

Figure 5:
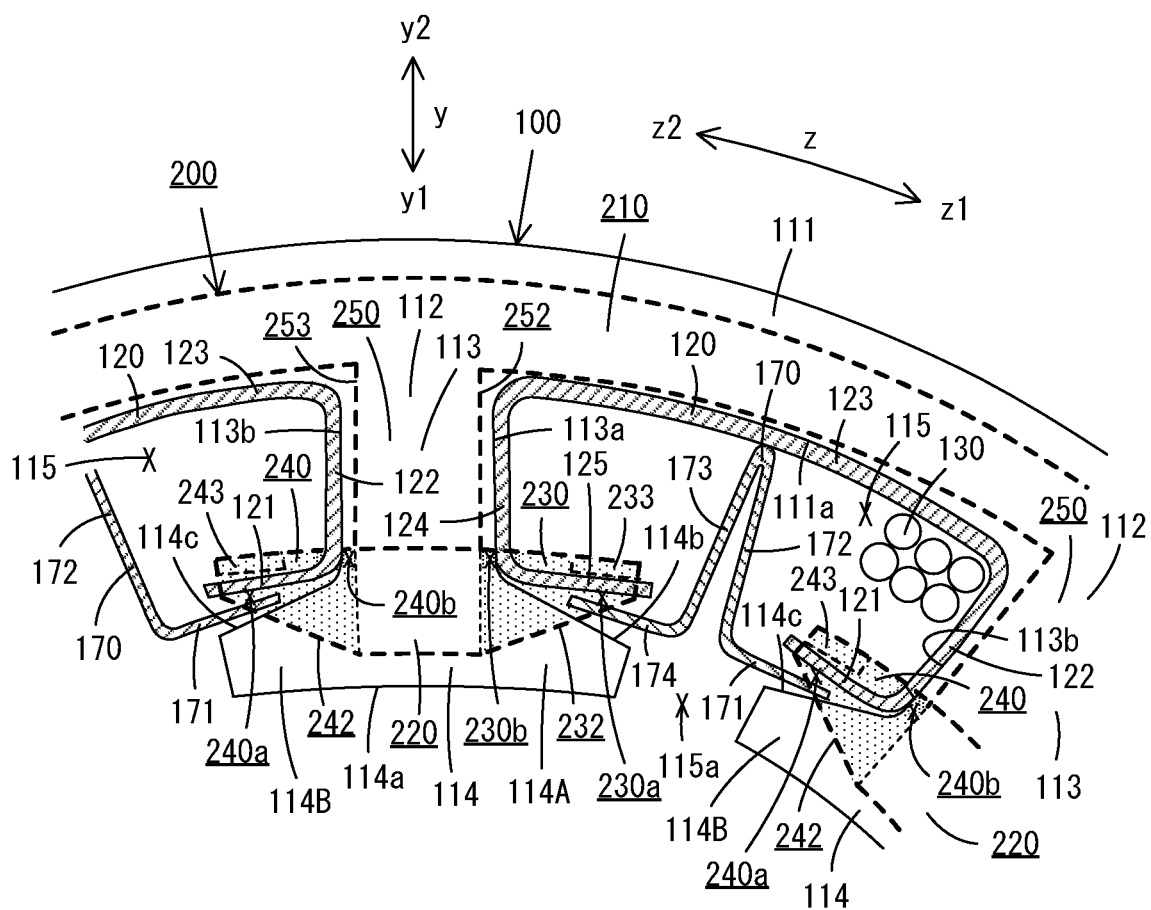
FIG. 5 schematically illustrates a relationship of a stator core, slot insulation members, interface insulation members and the electrical insulator assemblies in the stator used in the motor according to the first embodiment.

As shown in FIG. 5, the stator core 100 includes a yoke 111, a plurality of teeth 112 and a plurality of slots 115.

The yoke 111 extends in the circumferential direction. In this embodiment, the yoke 111 is annular.

The teeth 112 are spaced apart from each other in the circumferential direction and extend radially inward from the yoke 111. Each of the teeth 112 has a tooth base part 113 that extends radially inward from the yoke 111 and a tooth tip part 114 that is formed on a radially inner end of the tooth base part 113 and that extends in the circumferential direction.

The tooth base part 113 has a first tooth base part side surface 113a on the first side in the circumferential direction and a second tooth base part side surface 113b on the second side in the circumferential direction.

The tooth tip part 114 has a tooth tip part inner peripheral surface 114a on the radially inner side, a first tooth tip part outer peripheral surface 114b on the radially outer side on the first side in the circumferential direction, and a second tooth tip part outer peripheral surface 114c on the radially outer side on the second side in the circumferential direction.

The tooth tip part 114 has a first tooth projection 114A and a second tooth projection 114B that respectively protrude to the first side and the second side in the circumferential direction from the tooth base part 113. The first tooth projection 114A is defined by the tooth tip part inner peripheral surface 114a and the first tooth tip part outer peripheral surface 114b, and the second tooth projection 114B is defined by the tooth tip part inner peripheral surface 114a and the second tooth tip part outer peripheral surface 114c.

In this embodiment, the first tooth projection 114A and the second tooth projection 114B correspond to a non-limiting embodiment of a "pair of tooth projections" according to this disclosure.

The tooth tip part inner peripheral surfaces 114a define a stator core inner space 100a.

A rotor (not shown in FIGS. 1 and 2) is rotatably arranged within the stator core inner space 100a. Known rotors of various configurations can be used as the rotor.

The stator 10 and the rotor arranged within the stator core inner space 100a form the motor according to the first embodiment of the present disclosure.

The motor of the first embodiment can be used, for example, as a motor for driving a compression mechanism for compressing refrigerant. Known compression mechanisms of various configurations can be used as the compression mechanism for compressing refrigerant.

A compressor that has a compression mechanism and the motor of the first embodiment corresponds to a compressor according to one embodiment of this disclosure. The compressor of this embodiment according to this disclosure is described later with reference to FIG. 24.

Each pair of the teeth 112 adjacent to each other in the circumferential direction and the yoke 111 define a slot 115. More specifically, the slot 115 is defined by a yoke inner peripheral surface 111a of the yoke 111, the second tooth base part side surface 113b and the second tooth tip part outer peripheral surface 114c of the tooth 112 arranged on the first side in the circumferential direction, and the first tooth base part side surface 113a and the first tooth tip part outer peripheral surface 114b of the tooth 112 arranged on the second side in the circumferential direction. A slot opening 115a is formed between the tooth tip parts 114 of the adjacent teeth 112.

A slot insulation member is inserted in the slot 115.

Figure 10:
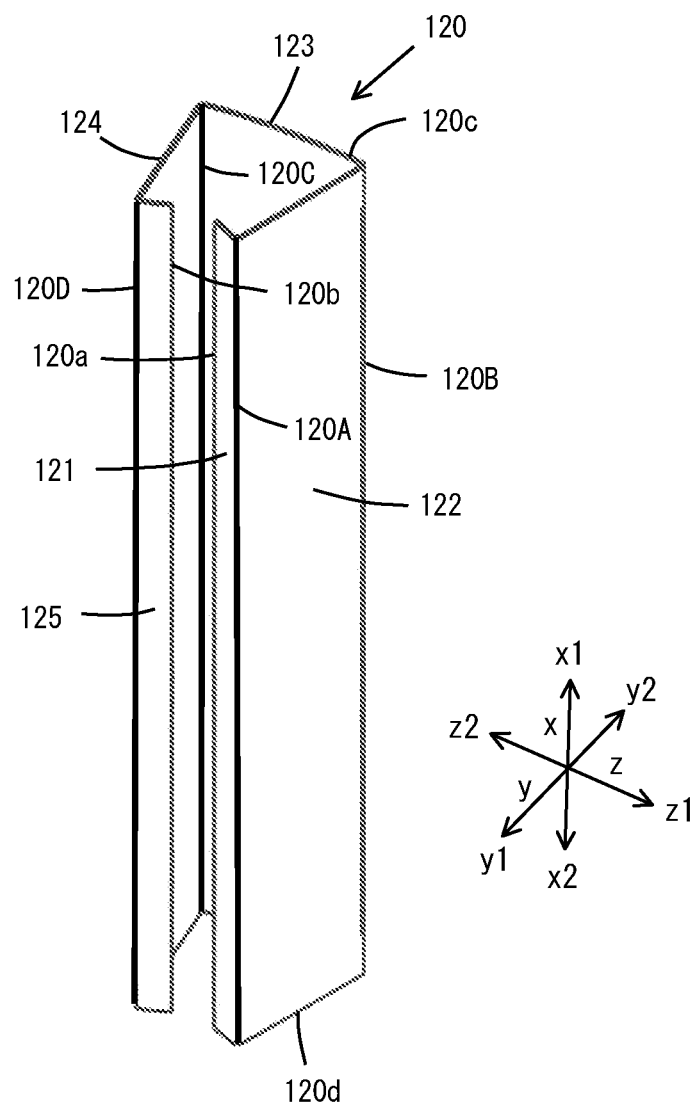
FIG. 10 is a perspective view of a slot insulation member of the stator used in the motor according to the first embodiment.

In this embodiment, the slot insulation member 120 shown in FIG. 10 is used.

The slot insulation member 120 is formed by folding a rectangular sheet-like resin film formed of resin (polymer) having electrical insulating properties. Resin films made of various kinds of known resin can be used.

Specifically, the slot insulation member 120 is formed by folding the rectangular insulation film, which has edges 120a and 120b extending in the axial direction and edges 120c and 120d extending in a direction that intersects (crosses) the axial direction, along folding lines 120A to 120D extending in parallel (or substantially in parallel) to the edges 120a and 120b. The slot insulation member 120 is divided into a first end part 121, a first intermediate part 122, a central part 123, a second intermediate part 124 and a second end part 125 by the folding lines 120A to 120D.

The first intermediate part 122, the central part 123 and the second intermediate part 124 are folded into a generally U-shape, and together form a body of the slot insulation member. Further, the first end part 121 and the second end part 125 are folded toward the inside of the U-shape such that the edges 120a and 120b come close to each other.

As shown in FIG. 5, the body of the slot insulation member 120 is arranged over the yoke inner peripheral surface 111a and the second tooth base part side surface 113b of the tooth 112 arranged on the first side in the circumferential direction and the first tooth base part side surface 113a of the tooth 112 arranged on the second side in the circumferential direction. Further, the first end part 121 is arranged to face the second tooth tip part outer peripheral surface 114c of the tooth 112 arranged on the first side in the circumferential direction, and the second end part 125 is arranged to face the first tooth tip part outer peripheral surface 114b of the tooth 112 arranged on the second side in the circumferential direction.

The slot insulation member 120 is folded such that when the slot insulation member 120 is inserted into the slot 115, a distance between the first end part 121 and the second tooth tip part outer peripheral surface 114c of the tooth 112 arranged on the first side in the circumferential direction gradually increases toward the second side in the circumferential direction. Similarly, the slot insulation member 120 is folded such that a distance between the second end part 125 and the first tooth tip part outer peripheral surface 114b of the tooth 112 arranged on the second side in the circumferential direction gradually increases toward the first side in the circumferential direction.

The slot insulation member 120 corresponds to a non-limiting embodiment of a "first insulation member" according to this disclosure. The first intermediate part 122, the central part 123 and the second intermediate part 124 together form a "body of the first insulation member" according to this disclosure. The first end part 121 and the second end part 125 correspond to a non-limiting embodiment of a "pair of first end parts of the first insulation member" according to this disclosure.

In FIG. 5, the slot insulation member 120 is inserted into the slot 115 such that the first end part 121 is arranged on the first side in the circumferential direction and the second end part 125 is arranged on the second side in the circumferential direction. The slot insulation member 120 can also be inserted into the slot 115 such that the first end part 121 is arranged on the second side in the circumferential direction and the second end part 125 is arranged on the first side in the circumferential direction.

In this case, the end part 121 and the intermediate part 122 correspond to the second end part and the second intermediate part, respectively, and the end part 125 and the intermediate part 124 correspond to the first end part and the first intermediate part, respectively.

Figure 2:
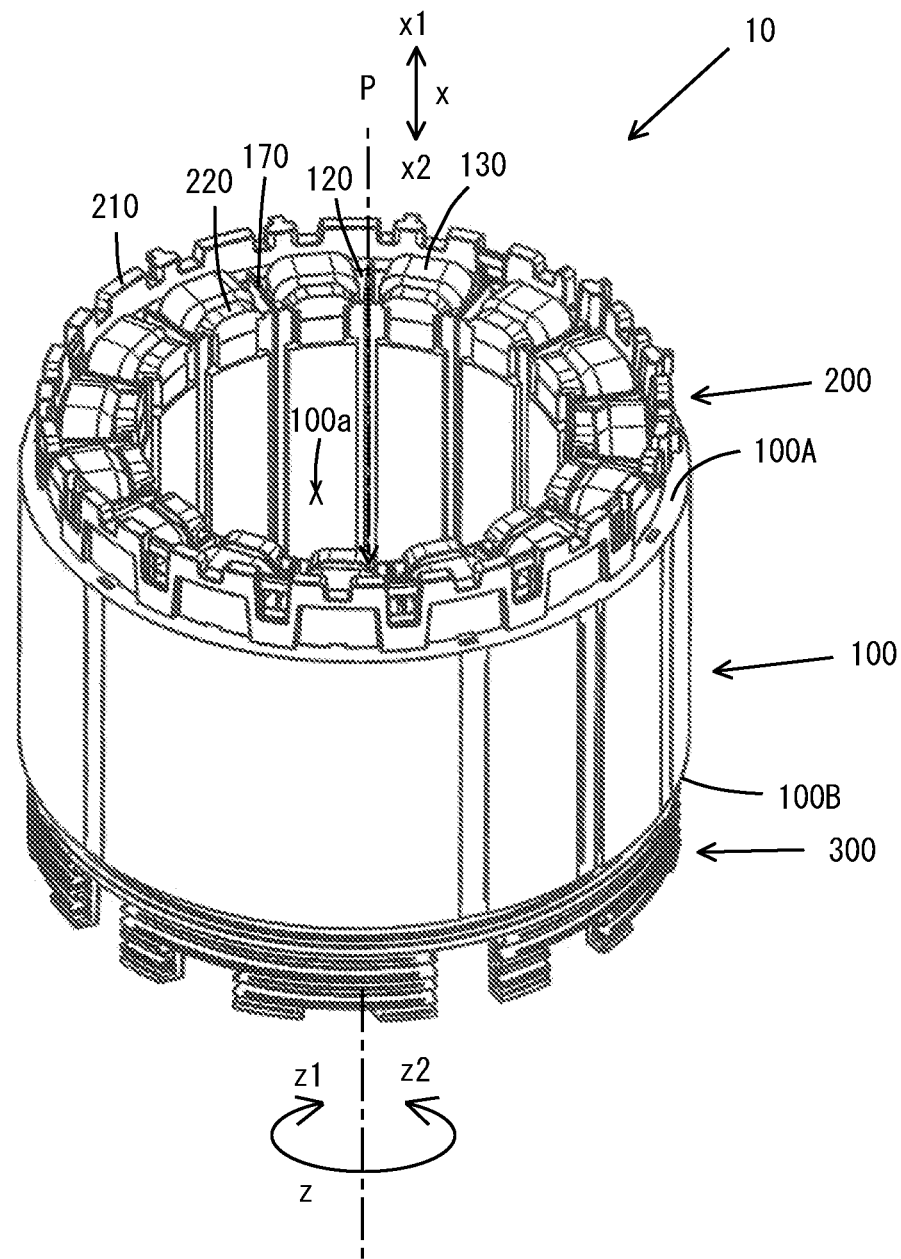
FIG. 2 is a perspective view of the stator shown in FIG. 1 with a cover removed.

As shown in FIG. 2, the first electrical insulator assembly 200 and the second electrical insulator assembly 300 are arranged on stator core end surfaces on both sides of the stator core 100 in the axial direction, respectively. In the first embodiment, the first electrical insulator assembly 200 is arranged on the stator core end surface (first stator core end surface) 100A on the first side of the stator core 100 in the axial direction such that an electrical insulator assembly end surface 250A of the first electrical insulator assembly 200 faces the stator core end surface 100A. Further, the second electrical insulator assembly 300 is arranged on the stator core end surface (second stator core end surface) 100B on the second side of the stator core 100 in the axial direction such that an electrical insulator assembly end surface 350A of the second electrical insulator assembly 300 faces the stator core end surface 100B.

The first and second electrical insulator assemblies 200, 300 are formed of resin having electrical insulating properties.

The electrical insulator assemblies may also be referred to as "insulating bobbins", "resin bobbins" or "coil bobbins".

Figure 3:
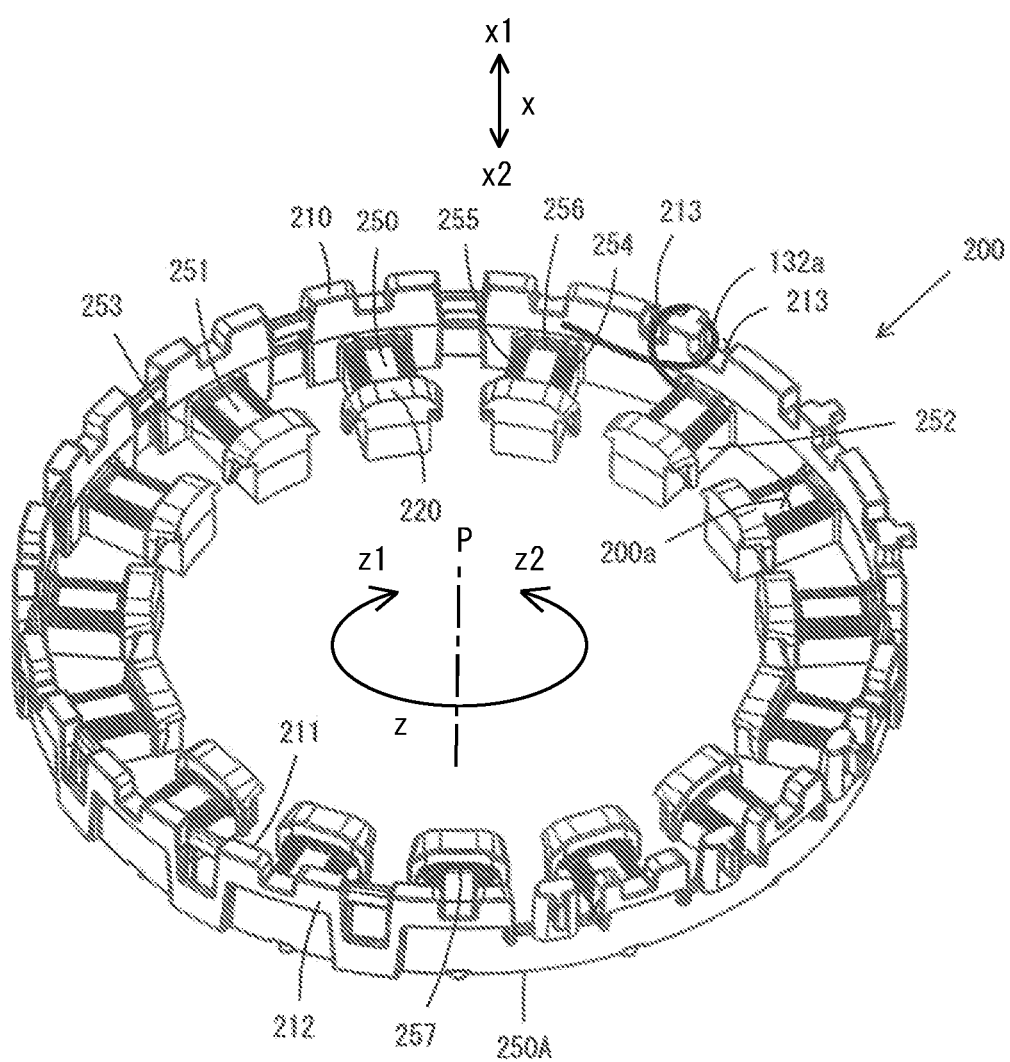
FIG. 3 is a perspective view of a first electrical insulator assembly of the stator used in the motor according to the first embodiment.

As shown in FIG. 3, the first electrical insulator assembly 200 has an outer wall part 210, a plurality of inner wall parts 220 and a plurality of connection parts 250.

The outer wall part 210 extends in the circumferential direction and the axial direction. The outer wall part 210 is arranged to face the yoke 111 of the stator core 100.

The inner wall parts 220 are arranged radially inside the outer wall part 210 and extend in the circumferential direction and the axial direction.

The connection parts 250 extend in the circumferential direction and the radial direction and connect the outer wall part 210 and the inner wall parts 220. The outer wall part 210 is arranged to face the teeth 112 (specifically, the tooth base part 113) of the stator core 100.

Figure 6A:
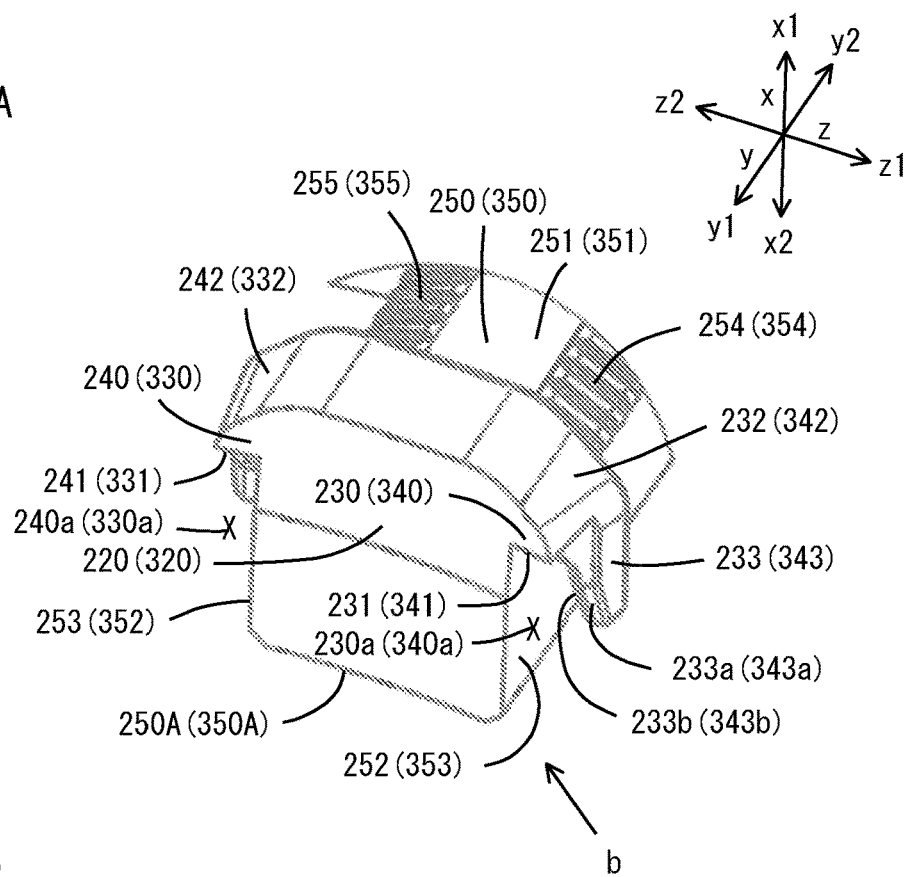
FIGS. 6A and 6B are perspective views of significant parts of the first electrical insulator assembly of the stator used in the motor according to the first embodiment.
Figure 6B:
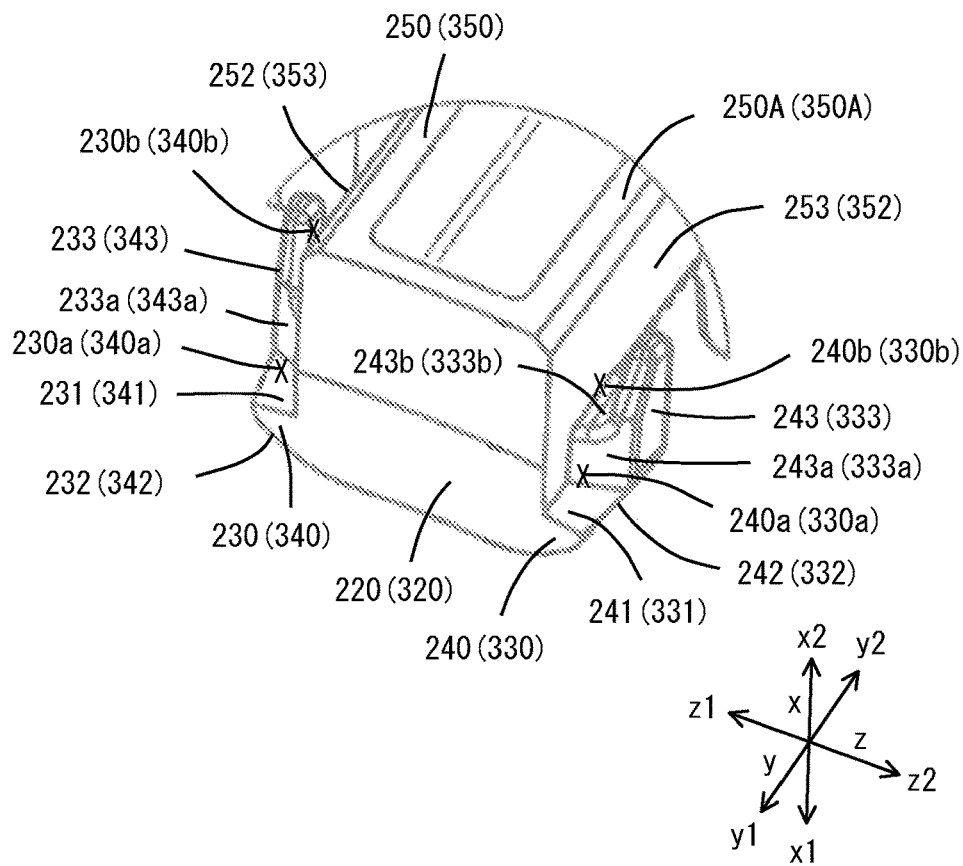

As shown in FIGS. 5, 6A and 6B, each of the inner wall parts 220 has a first flange 230 and a second flange 240 that respectively protrude to the first side and the second side in the circumferential direction. FIG. 6B is a perspective view of the inner wall part 220 as viewed from a direction of arrow b in FIG. 6A.

As shown in FIG. 5, the first flange 230 protrudes to face the slot 115 on the first side of the connection part 250 in the circumferential direction, and the second flange 240 protrudes to face the slot 115 on the second side of the connection part 250 in the circumferential direction.

The first flange 230 has a first movement restriction surface 231 that faces the slot 115 on the first side of the connection part 250 in the circumferential direction and an outer peripheral surface 232 on the first side in the circumferential direction.

The first flange 230 further has a first inner wall projection 233 that protrudes to the second side in the axial direction (to the side of the stator core end surface 100A). The first inner wall projection 233 has an end surface 233a on the radially inner side and a side surface 233b on the second side in the circumferential direction.

The first movement restriction surface 231, the end surface 233a of the first inner wall projection 233 and a first side surface 252 of the connection part 250 define a recess 230a that is open to the first side in the circumferential direction and the second side in the axial direction. The first side surface 252 of the connection part 250 and the side surface 233b of the first inner wall projection 233 define a recess 230b that is open to the second side in the axial direction and radially outwardly and inwardly.

The second flange 240 has a second movement restriction surface 241 that faces the slot 115 on the second side of the connection part 250 in the circumferential direction, and an outer peripheral surface 242 on the second side in the circumferential direction.

The second flange 240 further has a second inner wall projection 243 that protrudes to the second side in the axial direction (to the side of the stator core end surface 100A). The second inner wall projection 243 has an end surface 243a on the radially inner side, and a side surface 243b on the first side in the circumferential direction.

The second movement restriction surface 241, the end surface 243a of the second inner wall projection 243 and a second side surface 253 of the connection part 250 define a recess 240a that is open to the second side in the circumferential direction and the second side in the axial direction. The second side surface 253 of the connection part 250 and the side surface 243b of the second inner wall projection 243 define a recess 240b that is open to the second side in the axial direction and radially outwardly and inwardly.

The end surfaces 233a, 243a extend in the axial direction and the circumferential direction.

In this embodiment, the first flange 230 corresponds to a non-limiting embodiment of a "first movement restriction part" according to this disclosure. The first movement restriction surface 231 and the end surface 233a correspond to non-limiting embodiments of a "first axial movement restriction surface" and a "first radial movement restriction surface" according to this disclosure, respectively.

Further, the second flange 240 corresponds to a non-limiting embodiment of a "second movement restriction part" according to this disclosure. The second movement restriction surface 241 and the end surface 243a correspond to non-limiting embodiments of a "second axial movement restriction surface" and a "second radial movement restriction surface" according to this disclosure, respectively.

Figure 4:
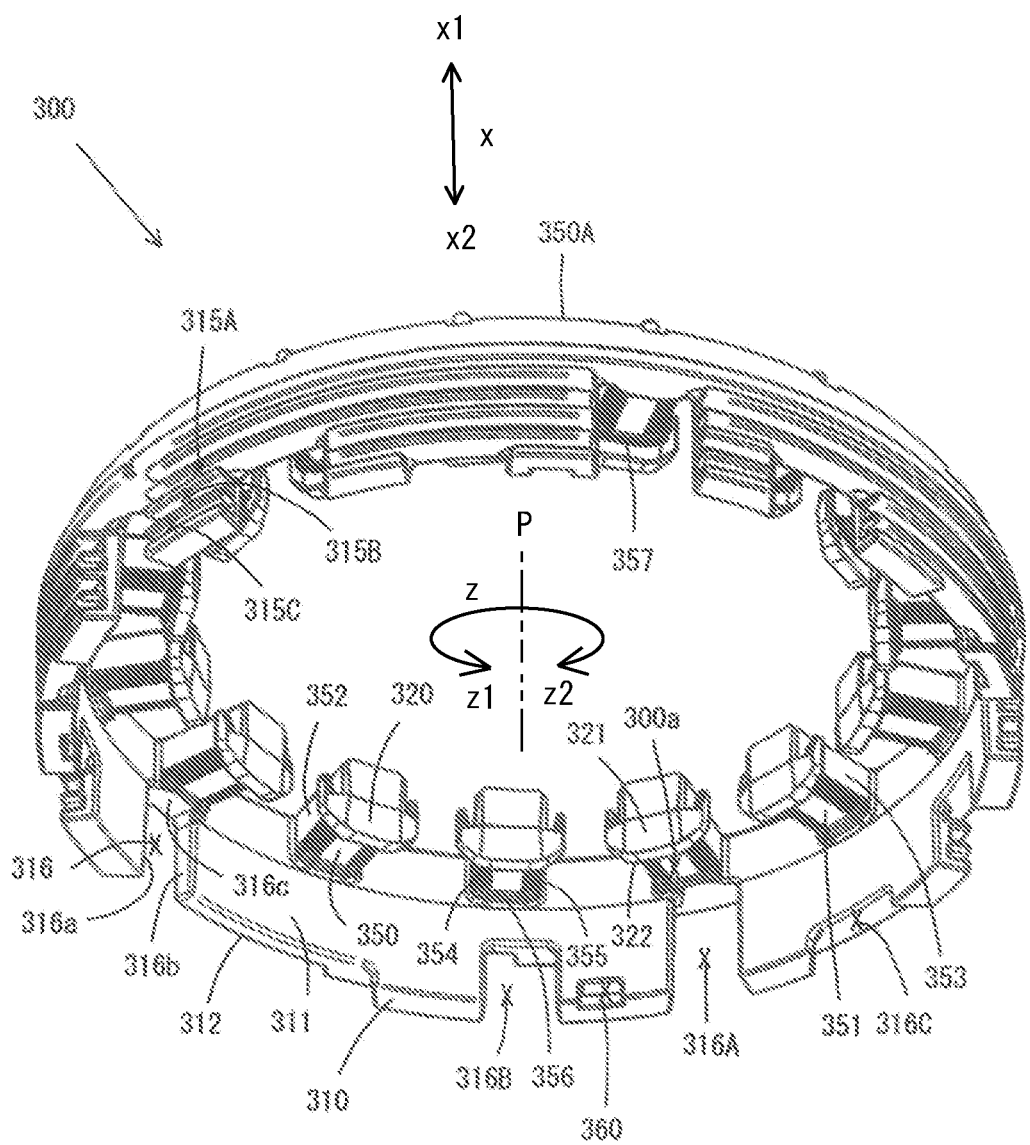
FIG. 4 is a perspective view of a second electrical insulator assembly of the stator used in the motor according to the first embodiment.

Further, as shown in FIG. 4, like the first electrical insulator assembly 200, the second electrical insulator assembly 300 has an outer wall part 310, a plurality of inner wall parts 320 and a plurality of connection parts 350.

In this embodiment, the connection parts 250 of the first electrical insulator assembly 200 and the connection parts 350 of the second electrical insulator assembly 300 correspond to non-limiting embodiments of "extending parts extending radially inward from the outer wall part" according to this disclosure.

The inner wall parts 320 of the second electrical insulator assembly 300 are configured similarly to the inner wall parts 220 of the first electrical insulator assembly 200, and therefore described with reference to FIGS. 6A and 6B. In FIGS. 6A and 6B, reference numerals for elements of the second electrical insulator assembly 300 are shown in parenthesis. In the second electrical insulator assembly 300, which is arranged such that the end surface 350A of the connection part 350 faces the stator core end surface 100B, the "first side in the axial direction (x1)" and the "second side in the axial direction (x2)", and the "first side in the circumferential direction (z1)" and the "second side in the circumferential direction (z2)" are the opposite of those of the first electrical insulator assembly 200.

Each of the inner wall parts 320 has a third flange 330 and a fourth flange 340 that respectively protrude to the first side and the second side in the circumferential direction. The third flange 330 protrudes to face the slot 115 on the first side of the connection part 350 in the circumferential direction. The fourth flange 340 protrudes to face the slot 115 on the second side of the connection part 350 in the circumferential direction.

The third flange 330 has a third movement restriction surface 331 that faces the slot 115 and an outer peripheral surface 332 on the first side in the circumferential direction. The fourth flange 340 has a fourth movement restriction surface 341 that faces the slot 115 and an outer peripheral surface 342 on the second side in the circumferential direction.

The third and fourth movement restriction surfaces 331, 341 extend in the circumferential direction and the radial direction.

The third flange 330 further has a third inner wall projection 333 that protrudes to the first side in the axial direction (to the side of the stator core end surface 100B). The third inner wall projection 333 has an end surface 333a on the radially inner side and a side surface 333b on the second side in the circumferential direction.

The third movement restriction surface 331, the end surface 333a of the third inner wall projection 333 and a first side surface 352 of the connection part 350 of the second electrical insulator assembly 300 define a recess 330a that is open to the first side in the circumferential direction and the first side in the axial direction. The first side surface 352 of the connection part 350 of the second electrical insulator assembly 300 and the side surface 333b of the third inner wall projection 333 define a recess 330b that is open to the first side in the axial direction and radially outwardly and inwardly.

The fourth flange 340 further has a fourth inner wall projection 343 that protrudes to the first side in the axial direction (to the side of the stator core end surface 100B). The fourth inner wall projection 343 has an end surface 343a on the radially inner side and a side surface 343b on the first side in the circumferential direction.

The fourth movement restriction surface 341, the end surface 343a of the fourth inner wall projection 343 and a second side surface 353 of the connection part 350 of the second electrical insulator assembly 300 define a recess 340a that is open to the second side in the circumferential direction and the first side in the axial direction. The second side surface 353 of the connection part 350 of the second electrical insulator assembly 300 and the side surface 343b of the fourth inner wall projection 343 define a recess 340b that is open to the first side in the axial direction and radially outwardly and inwardly.

In this embodiment, the third flange 330 corresponds to a non-limiting embodiment of a "third movement restriction part" according to this disclosure. The third movement restriction surface 331 and the end surface 333a correspond to non-limiting embodiments of a "third axial movement restriction surface" and a "third radial movement restriction surface" according to this disclosure, respectively.

Further, the fourth flange 340 corresponds to a non-limiting embodiment of a "fourth movement restriction part" according to this disclosure. The fourth movement restriction surface 341 and the end surface 343a correspond to non-limiting embodiments of a "fourth axial movement restriction surface" and a "fourth radial movement restriction surface" according to this disclosure, respectively.

In the following description, the "electrical insulator assembly" is simply referred to as an "assembly". Further, the "first electrical insulator assembly 200" and the "second electrical insulator assembly 300" are simply referred to as a "first assembly 200" and a "second assembly 300", respectively.

The stator winding 130 is formed by winding a lead wire 132 around the teeth 112 of the stator core 100 and the corresponding connection parts 250, 350 of the first and second assemblies 200, 300 (see FIGS. 8A and 8B) after the slot insulation members 120 are inserted into the slots 115 of the stator core 100 and the first and second assemblies 200, 300 are arranged on the opposite sides of the stator core 100 in the axial direction. Various known methods can be used to wind the lead wire 132. For example, the lead wire 132 can be wound by turning a needle for supplying the lead wire 132 around the teeth 112 and the connection parts 250, 350.

The lead wire 132 is constituted, for example, of a copper or aluminum conductor and an insulation film covering an outer periphery of the conductor.

The amount (the number of turns) of the lead wire 132 to be wound and stored in the slot 115 is reduced and thus the space factor is reduced if the lead wires 132 of a plurality of turns cross each other when wound around each of the teeth 112.

The wound state of the lead wire 132 in a first row around the tooth 112 significantly affects whether such crossing of the lead wire 132 occurs. For example, if the lead wire 132 is not wound in alignment in the first row, the lead wire 132 is likely to cross the lead wire 132 wound in the second row.

In this embodiment, the connection parts 250 of the first assembly 200 and the connection parts 350 of the second assembly 300 are configured to prevent crossing of the lead wire 132.

Figure 7A:
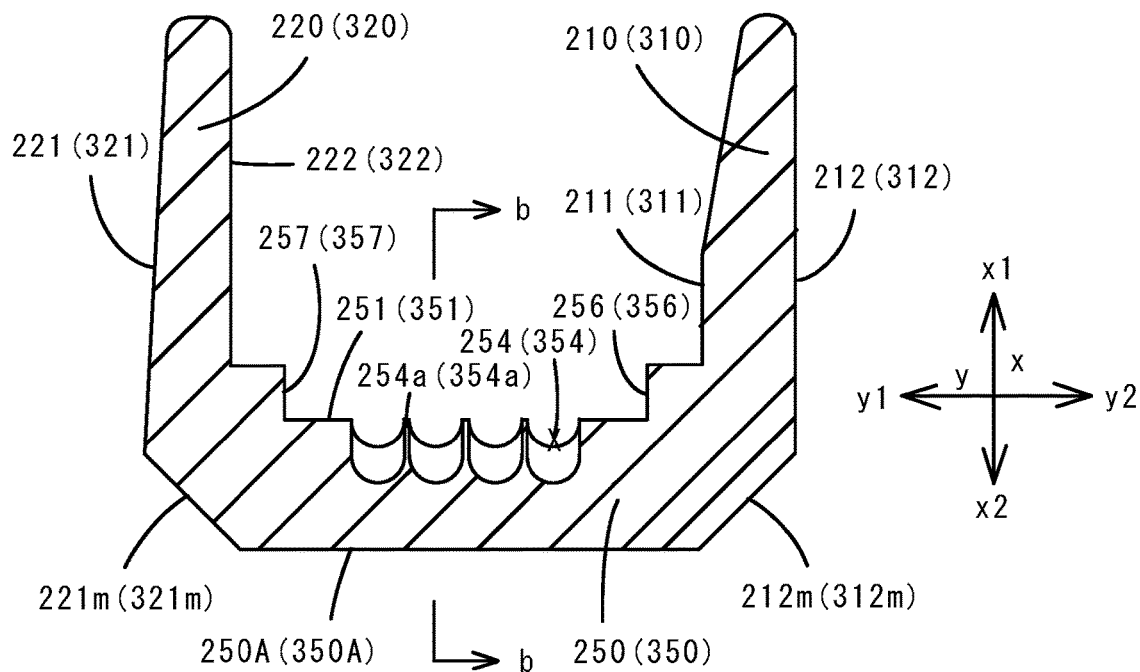
FIGS. 7A and 7B are sectional views of the first electrical insulator assembly of the stator used in the motor according to the first embodiment.

The connection parts 250, 350 of the first and second assemblies 200, 300 have the same shape. Therefore, the shape of the connection part 250 of the first assembly 200 is now described with reference to FIGS. 7A and 7B. FIG. 7A is a sectional view of the first assembly 200 taken along the radial direction, and FIG. 7B is a sectional view taken along line b-b in FIG. 7A.

Figure 7B:
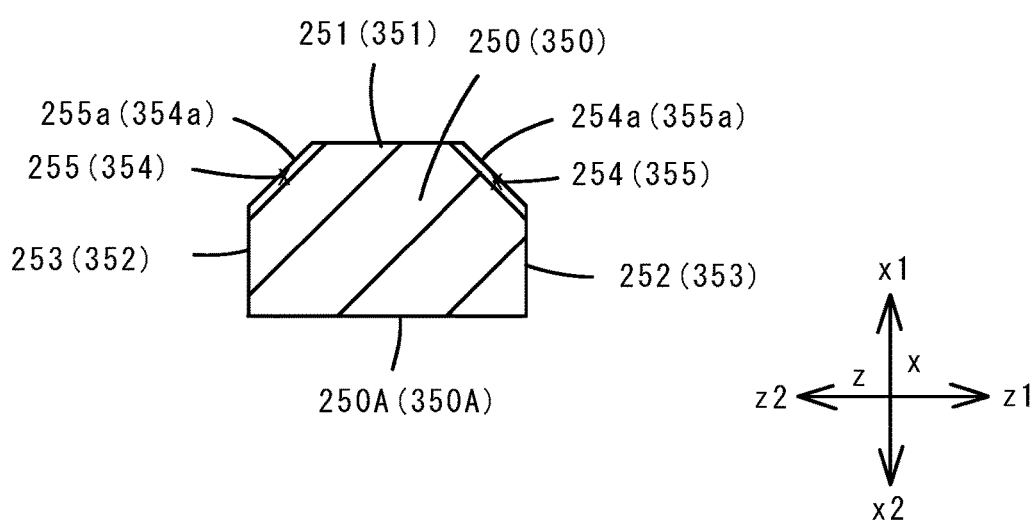

In FIGS. 7A and 7B, reference numerals for elements of the connection part 350 of the second assembly 300 are shown in parenthesis.

The connection part 250 has a top surface 251 on the side opposite to the stator core 100 and has first and second side surfaces 252 and 253 respectively formed on the first and second sides in the circumferential direction. The top surface 251 extends in the radial direction and the circumferential direction. The first and second side surfaces 252, 253 extend in the axial direction and the radial direction.

A plurality of grooves 254 extending in the circumferential direction are formed in a connection between the top surface 251 and the first side surface 252. In this embodiment, the grooves 254 are defined by a plurality of projections 254a extending in parallel (or substantially in parallel) in the circumferential direction.

Similarly, a plurality of grooves 255 that are defined by a plurality of projections 255a extending in parallel (or substantially in parallel) in the circumferential direction are formed in a second connection surface between the top surface 251 and the second side surface 253.

The lead wire 132 in the first row can be aligned during winding by the grooves 254 (255) in the connection between the top surface 251 and the first side surface 252 (the second side surface 253). This prevents crossing of the lead wire 132 in the second and subsequent rows.

Further, if the projections 254a (255a) that define the grooves 254 (255) each have a sharp protruding end, the insulation film of the lead wire 132 arranged in the grooves 254 (255) may be damaged. It is therefore preferable that each of the projections 254a (255a) does not have a sharp protruding end. The description that "the projection does not have a sharp protruding end" means that "the projection does not have a protruding end sharpened at an acute angle". The projection not having a sharp protruding end corresponds, for example, to a projection having a protruding end surface of a curved shape including a circular-arc shape (round shape), or a flat shape.

Further, a stepped surface 256 is formed between the top surface 251 of the connection part 250 and an inner peripheral surface 211 of the outer wall part 210 and protrudes to the side opposite to the stator core 100.

Similarly, a stepped surface 257 is formed between the top surface 251 of the connection part 250 and an outer peripheral surface 222 of the inner wall part 220 and protrudes to the side opposite to the stator core 100.

The lead wire 132 of the first row can be aligned during winding by the stepped surface 256 between the top surface 251 of the connection part 250 and the inner peripheral surface 211 of the outer wall part 210, or by the stepped surface 257 between the top surface 251 of the connection part 250 and the outer peripheral surface 222 of the inner wall part 220.

The height of the stepped surface 256 and the distance between the inner peripheral surface 211 of the outer wall part 210 and the stepped surface 256, and the height of the stepped surface 257 and the distance between the outer peripheral surface 222 of the inner wall part 220 and the stepped surface 257 are appropriately set such that the lead wire 132 can be wound in alignment.

Further, any one of the grooves 254, the grooves 255, the stepped surface 256 and the stepped surface 257, or any combination appropriately selected therefrom may be provided.

The end surface 250A of the connection part 250 on the stator core 100 side is used as an end surface of the first assembly 200.

The connection part 350 of the second assembly 300 is formed similarly to the connection part 250 of the first assembly 200.

Specifically, in the connection part 350, a plurality of grooves 354 (355) that are defined by a plurality of projections 354a (355a) are formed in a connection between a top surface 351 and a first side surface 352 (a second side surface 353). Further, a stepped surface 356 (357) is formed between the top surface 351 of the connection part 350 and an inner peripheral surface 311 of the outer wall part 310 (an outer peripheral surface 322 of the inner wall part 320).

Further, in this embodiment, as shown in FIGS. 7A and 7B, parts of outer and inner peripheral surfaces of the first assembly 200 on the stator core 100 side are respectively formed as inclined surfaces.

Specifically, a part 212m of an outer peripheral surface 212 of the outer wall part 210 on the stator core end surface 100A side is formed as an inclined surface that is inclined radially inward such that the distance between the outer peripheral surface 212 and the stator core end surface 100A gradually decreases toward the stator core end surface 100A. In other words, the inclined surface 212m is inclined radially inward toward the stator core end surface 100A.

Further, a part 221m of an inner peripheral surface 221 of the inner wall part 220 on the stator core end surface 100A side is formed as an inclined surface that is inclined radially outward such that the distance between the inner peripheral surface 221 and the stator core end surface 100A gradually decreases toward the stator core end surface 100A. In other words, the inclined surface 221m is inclined radially outward toward the stator core end surface 100A.

In this embodiment, like in the first assembly 200, parts of outer and inner peripheral surfaces of the second assembly 300 on the stator core 100 side are respectively formed as inclined surfaces. Specifically, a part of an outer peripheral surface 312 of the outer wall part 310 on the stator core end surface 100B side is formed as an inclined surface 312m that is inclined radially inward toward the stator core end surface 100B. Further, a part of an inner peripheral surface 321 of the inner wall part 320 on the stator core end surface 100B side is formed as an inclined surface 321m that is inclined radially outward toward the stator core end surface 100B.

The inclined surface may be a linearly extending surface (tapered surface) or a surface extending in a curved shape or a stepped shape.

In this embodiment, a lead wire (crossover wire) is not guided on the outside of the outer wall part 210 of the first assembly 200. In this case, the insulation distance (creepage distance) between the lead wire within a recess 200a of the first assembly 200 and the stator core end surface 100A can be increased by the presence of the inclined surface 212m formed in the outer peripheral surface 212 of the outer wall part 210 or the inclined surface 221m formed in the inner peripheral surface 221 of the inner wall part 220.

Further, in this embodiment, a lead wire (crossover wire) is wired on the outside of the outer wall part 310 of the second assembly 300. In this case, the insulation distance (creepage distance) between the lead wire (crossover wire) wired on the outside of the outer wall part 310 of the second assembly 300 and the stator core end surface 100B can be increased by the presence of the inclined surface 312m formed in the outer peripheral surface 312 of the outer wall part 310. Further, the insulation distance (creepage distance) between the lead wire within a recess 300a of the second assembly 300 and the stator core end surface 100B can be increased by the presence of the inclined surface 321m formed in the inner peripheral surface 321 of the inner wall part 320.

The electrical insulating properties of the assemblies can be enhanced by forming the inclined surfaces in parts of the outer and inner peripheral surfaces (the outer peripheral surfaces of the outer wall parts and the inner peripheral surfaces of the inner wall parts) of the assemblies on the stator core side without increasing the height of the assemblies.

The inclined surfaces (the inclined surface of the outer wall part and the inclined surface of the inner wall part) may be formed on only one of the first and second assemblies 200, 300. Further, the inclined surface may be formed on only one of the outer peripheral surface of the outer wall part and the inner peripheral surface of the inner wall part.

The stator winding 130 is formed by a plurality of phases of stator winding portions. In this embodiment, it is formed by first to third phases (U-, V- and W-phases) of stator winding portions. The stator winding portion of each phase has a plurality of winding portions connected in series or in parallel.

Figure 8A:
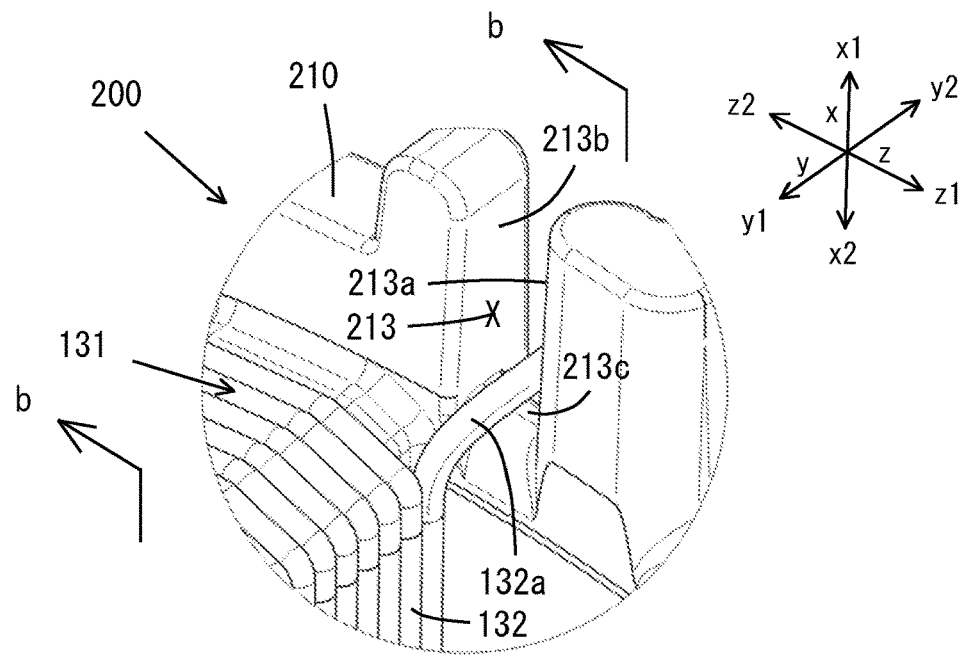
FIG. 8A is a perspective view of a winding part.
Figure 8B:
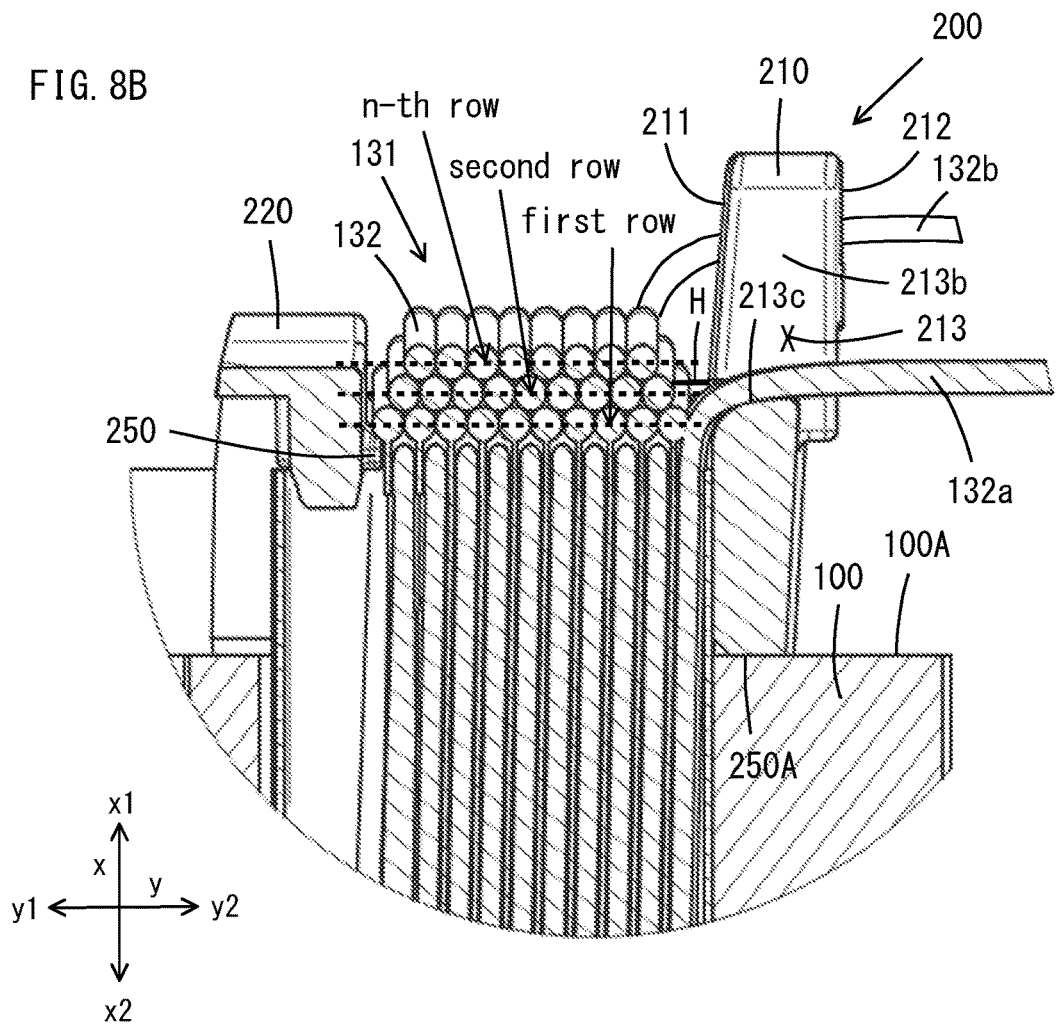
FIG. 8B is a sectional view taken in the direction of line b-b in FIG. 8A.

As shown in FIGS. 8A and 8B, each of the winding portions has a winding part 131 wound around the tooth 112 (more specifically, the tooth 112 and the connection parts 250, 350) and a pair of extensions 132a, 132b extending continuously from the both ends of the winding part 131. The extension 132a is a winding start wire and the extension 132b is a winding end wire.

The winding part 131 is formed by the lead wire 132 wound around the corresponding tooth 113 in rows (the first row to the n-th row) from the inner side to the outer side. When current is flowing through the stator winding 130, a potential difference between the lead wire 132 wound in the innermost first row and the lead wire 132 wound in the n-th row on the outer side is large. Therefore, if the lead wire 132 of the first row comes into contact with the lead wire 132 of the n-th row, poor insulation may be caused. The lead wire 132 of the first row extends continuously to the winding start wire 132a. In this case, it is necessary to prevent contact between the winding start wire 132a and the lead wire 132 wound on the outer side.

A method of processing the winding start wire 132a is now described with reference to FIGS. 8A and 8B.

FIG. 8A is an enlarged view of an essential part of the first assembly 200. FIG. 8B is a sectional view taken along line b-b in FIG. 8A. In FIG. 8A, only the lead wire 132 of the first row is shown, but actually, as shown in FIG. 8B, the lead wire 132 is wound in a plurality of rows.

In this embodiment, the lead wire 132 is wound around the tooth 112 by inserting a needle for supplying the lead wire 132 into the slot 115 from the slot opening 115a. In this embodiment, winding of the lead wire 132 by the needle is started from a radially outer position (on the outer wall part 210 side) and finished at a radially outer position (on the outer wall part 210 side). Specifically, the winding start wire 132a and the winding end wire 132b are arranged on the outer wall part 210 side on the first side surface 252 or the second side surface 253 of the connection part 250.

Therefore, in this embodiment, the outer wall part 210 of the first assembly 200 has a plurality of grooves 213 formed in positions corresponding to connections (in the vicinity of connections) with the first side surface 252 or the second side surface 253 of the connection part 250. The grooves 213 are open to the side opposite to the stator core 100 in the axial direction and open to the inner peripheral surface 211 and the outer peripheral surface 212 of the outer wall part 210. Each of the grooves 213 is defined by a side wall 213a on the first side in the circumferential direction, a side wall 213b on the second side in the circumferential direction and a bottom wall 213c.

The winding start wire 132a is drawn out from the inside of the outer wall part 210 (i.e. passes to the outside of the outer wall part 210) via the groove 213.

The groove 213 is formed to prevent the winding start wire 132a from at least coming into contact with or closer than a predetermined distance to the lead wire 132 of the outermost n-th row. For example, the depth of the groove 213 is set such that a distance H (see FIG. 8B) between the lead wire 132 of the n-th row and the winding start wire 132a does not become a set value or less.

In this embodiment, the winding start wire 132a (the lead wire 132 of the first row) is prevented from coming into contact with or into proximity to the lead wire 132 of the n-th row by passing the winding start wire 132a, which is continuous to the winding part 131 wound around the tooth 112, to the outside of the outer wall part 210.

At least one of the two end parts of the stator winding portions of the first to third phases is connected to a power supply. For example, when star-connected, one end part is connected to a power supply and the other end part is connected to a neutral point. When delta-connected, both end parts are connected to a power supply. The end part to be connected to a power supply is formed by the winding start wire 132a or the winding end wire 132b, which is continuous to the winding part 131 that forms the stator winding portion, and referred to as a power supply side lead wire.

The power supply side lead wire is connected to a power supply and thus needs to have higher insulation strength. Particularly if formed by the winding start wire 132a, the power supply side lead wire needs to be prevented from coming into contact with the lead wire 132 wound on the outer side as described above.

Processing of the winding start wire 132a in the case where the power supply side lead wire is formed by the winding start wire 132a is now described with reference to FIG. 3.

The winding start wire 132a forming the power supply side lead wire is covered with an insulation tube. The insulation tube is formed, for example, of resin (polymer) having electrical insulating properties.

The winding start wire 132a covered with the insulation tube is drawn out from the inner peripheral surface 211 side to the outer peripheral surface 212 side of the outer wall part 210 via one of the grooves 213 formed in the outer wall part 210 of the first assembly 200. Then the winding start wire 132a is drawn back from the outer peripheral surface 212 side to the inner peripheral surface 211 side of the outer wall part 210 via another groove 213. In FIG. 3, the winding start wire 132a is wound around a projection formed between the two grooves 213.

The winding start side end part covered with the insulation tube is then routed along the first side of the winding part 131 wound around the tooth 112 in the axial direction. Specifically, the winding start side end part covered with the insulation tube is arranged to overlap with the winding part 131 when viewed from the first side in the axial direction.

Where the power supply side lead wire is formed by the winding end wire 132b, the winding end wire 132b covered with the insulation tube is routed along the first side in the axial direction of the winding part 131.

Figure 20:
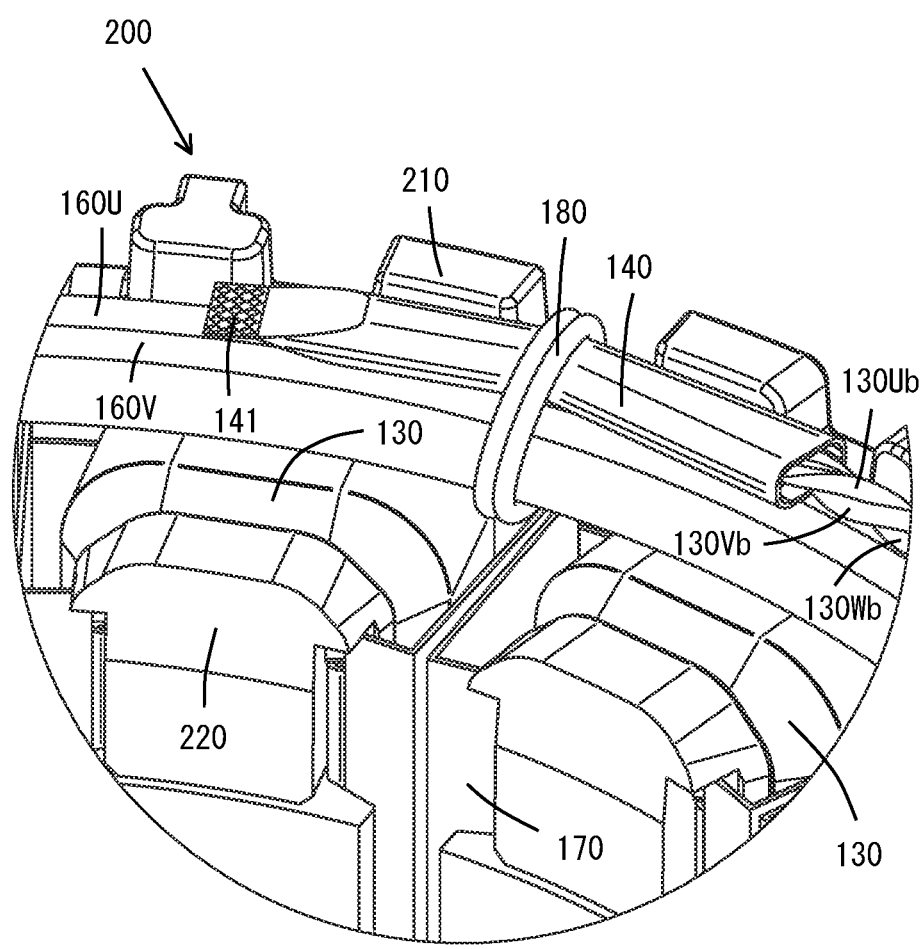
FIG. 20 is a perspective view of an example of an arrangement of the insulation member that covers the neutral point.

FIG. 20 shows the power supply side lead wire covered with the insulation tube routed along the first side in the axial direction of the winding part 131.

When continuously forming the winding parts 131, the lead wire 132 is routed such that one of a pair of the extensions (the winding start wire 132a, the winding end wire 132b) continuous to one winding part 131 is continuously connected to one of a pair of the extensions continuous to another winding part 131. Thus, a crossover wire for connecting two winding parts is provided.

In this embodiment, the crossover wire is wired on the second assembly 300 side.

As shown in FIG. 4, a plurality of notches 316 are formed in the outer wall part 310 of the second assembly 300 such that the crossover wire is drawn out from the inside to the outside of the outer wall part 310 or drawn back from the outside to the inside of the outer wall part 310 through the notches 316. Each of the notches 316 is open to the side opposite to the stator core 100 and to the outer and inner peripheral surfaces 312 and 311 of the outer wall part 310. The notch 316 is defined by a first side wall 316a on the first side in the circumferential direction, a second side wall 316b on the second side in the circumferential direction and a bottom wall 316c on the stator core 100 side.

In this embodiment, three types of notches 316A, 316B, 316C are formed in the outer wall part 310 such that the crossover wires that form the stator winding portions of the first to third phases are drawn out from the inside to the outside of the outer wall part 310 or drawn back from the outside to the inside of the outer wall part 310 therethrough while being prevented from coming into contact with each other.

Further, guide grooves 315A, 315B, 315C are formed in the outer peripheral surface 312 of the outer wall part 310 to guide the crossover wires drawn out to the outside of the outer wall part 310, along the outer peripheral surface 312. The guide grooves 315A, 315B, 315C have different axial depths and are spaced apart from each other in the circumferential direction so as to prevent contact between the crossover wires respectively inserted into the guide grooves 315A, 315B, 315C.

Each of the crossover wires is drawn out from the inside to the outside of the outer wall part 310 via one of the notches 316A, 316B, 316C. Then the crossover wire is guided via one of the guide grooves 315A, 315B, 315C of the outer peripheral surface 312 of the outer wall part 310 to be guided along the outer peripheral surface 312. Thereafter, the crossover wire is drawn back from the outside to the inside of the outer wall part 310 via one of the notches 316A, 316B, 316C.

The strength of the outer wall part 310 may be reduced if the notches 316A, 316B, 316C have the same depth. Therefore, in this embodiment, the notches 316A, 316B, 316C are formed to have different depths. This suppresses reduction of the strength of the outer wall part 310 due to provision of the notches 316A, 316B, 316C. Specifically, the tension of the crossover wire inserted into the notches 316A, 316B, 316C can be set high, so that movement (displacement) of the crossover wire can be prevented.

Figure 9A:
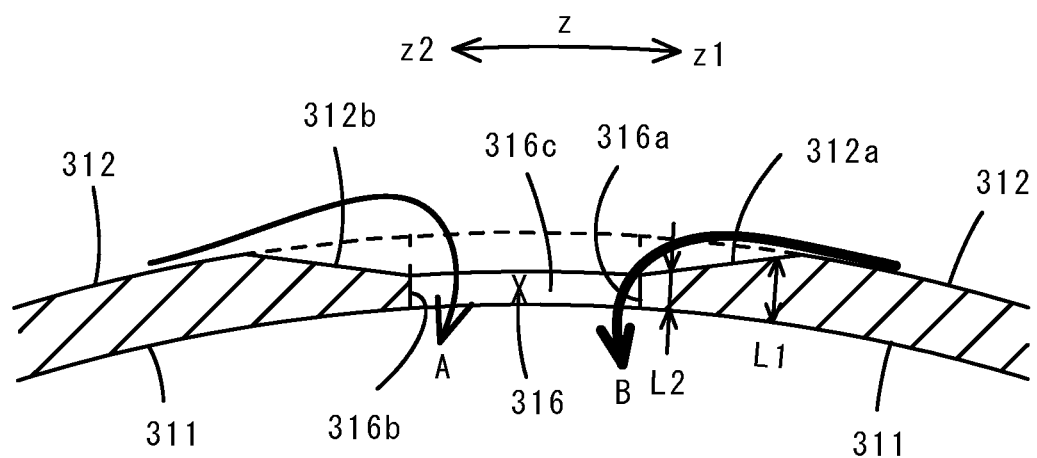
FIGS. 9A and 9B are sectional views of a part corresponding to a notch in the outer wall part of the second electrical insulator assembly of the stator used in the motor according to the first embodiment.
Figure 9B:
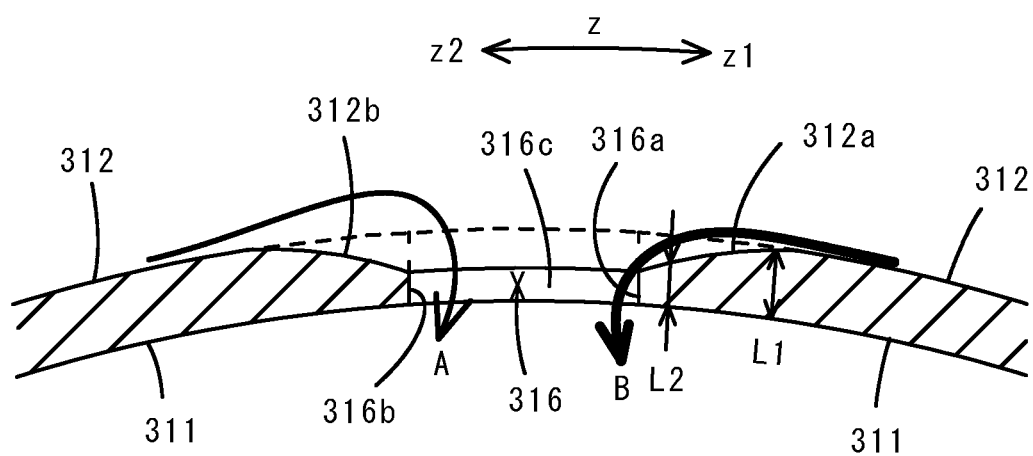

Conventionally, as shown by broken line in FIGS. 9A and 9B, the outer and inner peripheral surfaces 312 and 311 of the outer wall part 310 extend arcuately in parallel with a uniform distance therebetween. In this state, the crossover wire is drawn back from the outside to the inside of the outer wall part 310 via the notch 316. In this case, as shown by a thin solid arrow A, the crossover wire may make a large turn in such a manner as to project outward of the outer wall part 310 when passed through the notch 316. If projecting outward, the crossover wire may come into proximity to or into contact with other parts and cause insulation failure.

In this embodiment, at least the shape of a part of the outer peripheral surface 312 of the outer wall part 310 where the crossover wire is drawn back from the outside to the inside of the outer wall part 310 is modified as shown by solid line in FIGS. 9A and 9B. Specifically, the outer peripheral surface 312 of the outer wall part 310 is notched such that a distance (radial thickness) L between the outer peripheral surface 312 and the inner peripheral surface 311 gradually decreases toward the notch 316 along the circumferential direction. More specifically, the inner peripheral surface 311 of the outer wall part 310 extends arcuately as conventional. The outer peripheral surface 312 also extends arcuately as conventional up to the vicinity of the notch 316. The outer wall part 310 is then notched from the outer peripheral surface 312 side such that the distance L between the outer peripheral surface 312 and the inner peripheral surface 311 gradually decreases toward the notch 316 from the front vicinity of the notch 316 along the circumferential direction (L2<L1). In this embodiment, the outer wall part 310 is notched such that a linearly extending inclined surface 312a is formed on the outer peripheral surface 312 side.

The shape of the inclined surface 312a is not limited to this. For example, in an example shown in FIG. 9B, the inclined surface 312a has a circular arc shape curved radially outward.

Where the crossover wire is drawn through the notch 316 in a clockwise direction, the outer peripheral surface 312 of the outer wall part 310 is notched to form an inclined surface 312b.

This configuration of the outer peripheral surface 312 of the outer wall part 310, which is notched such that the distance (radial thickness) between the outer peripheral surface 312 and the inner peripheral surface 311 gradually decreases toward the notch 316 in the vicinity of the notch 316, suppresses outward projection of the crossover wire outward of the outer wall part 310 as shown by bold arrow B in FIGS. 9A and 9B.

The outer wall part 210, the inner wall parts 220 and the connection parts 250 of the first assembly 200 respectively have the same structures as the outer wall part 310, the inner wall parts 320 and the connection parts 350 of the second assembly 300, except for the structure (the grooves 213 through which the winding start wire is passed) for passing the winding start wire continuous to the winding part to the outside of the outer wall part, and the structure (the guide grooves 315A, 315B, 315C for guiding the wiring position of the crossover wires, the notches 316A, 316B, 316C through which the crossover wires are passed between the inside and the outside of the outer wall part) for wiring the crossover wires between the different winding parts via the outer peripheral surface of the outer wall part. The first assembly 200 and the second assembly 300 may have the same structure.

In this embodiment, on the first assembly 200 side, the power supply side lead wire of each of the stator winding portions that is connected to a power supply is routed along the circumferential direction within the recess 200a of the first assembly 200. Where the stator winding portion is star-connected, a neutral point side lead wire of the stator winding portion that is connected to a neutral point is also routed along the circumferential direction within the recess 200a of the first assembly 200 while being connected in common to the neutral point. For example, as shown in FIG. 20, the power supply side lead wires (160U, 160V) and the neutral point side lead wires (130Ub, 130Vb, 130Wb) are laid in this order on the side opposite to the stator core 100 relative to the winding part 131 of the stator winding 130. In FIG. 20, the power supply side lead wire (160W) is hidden.

The power supply side lead wires and the neutral point side lead wires are fixed to the first assembly 200, for example, with a binding string so as to be prevented from being moved (displaced).

Figure 13:
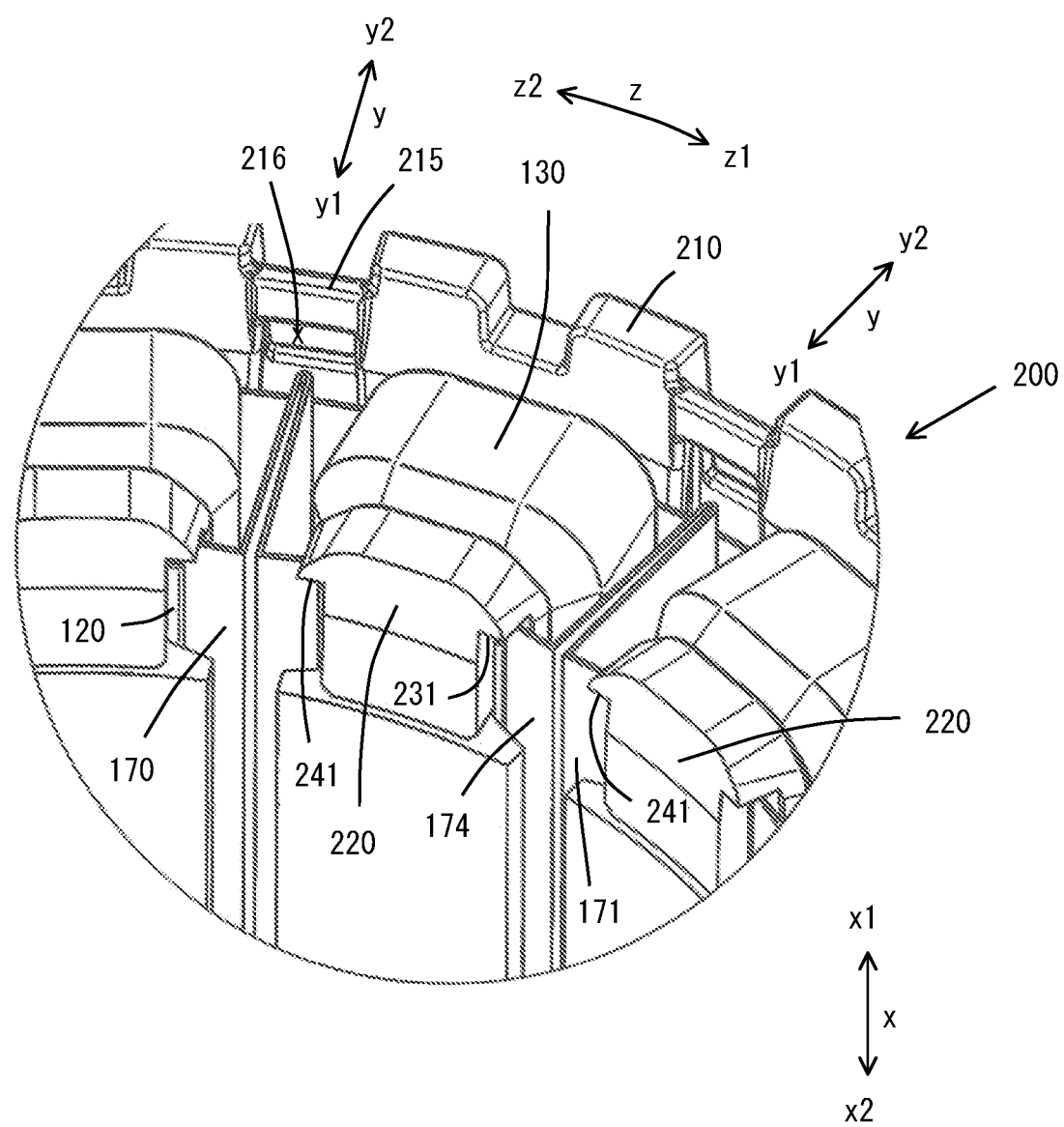
FIG. 13 is a perspective view illustrating how to insert the interphase insulation member into the slot.

In this embodiment, as shown in FIG. 13, thin parts 215 are formed in the outer wall part 210 of the first assembly 200.

Further, communication holes 216 are formed adjacent to the thin parts 215 and are open to the inner peripheral surface 211 and the outer peripheral surface 212 of the outer wall part 210.

The thin parts 215 are formed radially inward of the outer peripheral surface 212 of the outer wall part 210. Thus, a working space is created between the thin parts 215 and the outer peripheral surface 212 of the outer wall part 210.

The communication holes 216 are formed adjacent to the thin parts 215 in the axial direction to extend in the circumferential direction.

With this configuration, where the power supply side lead wires and the neutral point side lead wires are fixed by using a binding string 180 passed through the communication hole 216, the binding string 180 is prevented from projecting outward from the outer peripheral surface 212 of the outer wall part 210.

The interphase insulation member 170 is now described.

Figure 11:
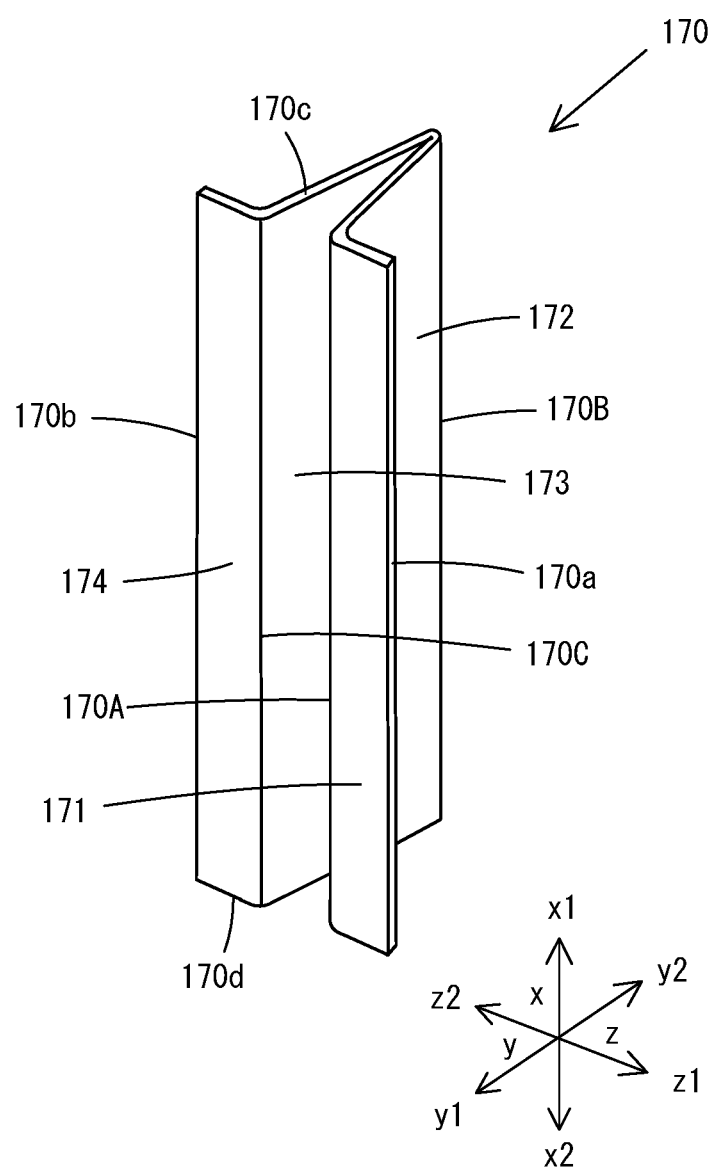
FIG. 11 is a perspective view of an interphase insulation member of the stator used in the motor according to the first embodiment.

In this embodiment, the interphase insulation member 170 shown in FIG. 11 is used.

The interphase insulation member 170 is formed by folding a resin film having electrical insulating properties.

The interphase insulation member 170 is formed by folding a rectangular insulation film, which has edges 170a and 170b extending in the axial direction and edges 170c and 170d extending in a direction crossing the axial direction, along folding lines 170A, 170B, 170C extending in parallel (or substantially in parallel) to the edges 170a and 170b. The interphase insulation member 170 is divided into a first end part 171, a first central part 172, a second central part 173 and a second end part 174 by the folding lines 170A, 170B, 170C.

The first central part 172 and the second central part 173 of the folded film form a V-shape. Further, the first and second end parts 171, 174 are folded in directions away from each other.

The interphase insulation member 170 corresponds to a non-limiting embodiment of a "second insulation member" according to this disclosure. The first central part 172 and the second central part 173 form an "interphase insulation part of the second insulation member" of this disclosure. The first and second end parts 171, 174 correspond to a non-limiting embodiment of a "pair of second end parts of the second insulation member" according to this disclosure.

A method of inserting the interphase insulation member 170 is now described.

First, with reference to FIGS. 5, 6A and 6B, the insertion of the slot insulation member 120 into the slot 115 of the stator core 110 and the arrangement of the first and second assemblies 200, 300 on the opposite sides of the stator core 100 in the axial direction are described.

The body of the slot insulation member 120 is arranged over the yoke inner peripheral surface 111a, the second tooth base part side surface 113b of the tooth 112 arranged on the first side in the circumferential direction and the first tooth base part side surface 113a of the tooth 112 arranged on the second side in the circumferential direction. Further, the first end part 121 and the second end part 125 are arranged to face the second tooth tip part outer peripheral surface 114c of the tooth 112 arranged on the first side in the circumferential direction and the first tooth tip part outer peripheral surface 114b of the tooth 112 arranged on the second side in the circumferential direction, respectively.

In this state, the first and second assemblies 200 and 300 are arranged on the opposite sides of the stator core 100 in the axial direction.

At this time, the inner wall part 220 of the first assembly 200 and the inner wall part 320 of the second assembly 300 restrict radially outward movement of the slot insulation member 120.

Specifically, the first end part 121 and the first intermediate part 122 are arranged within a recess 240a and a recess 240b of one of the adjacent inner wall parts 220 that is located on the first side in the circumferential direction. Thus, the folding line 120A between the first end part 121 and the first intermediate part 122 is arranged radially inside of the inner wall projection 243. Further, the first end part 121 and the first intermediate part 122 are arranged within a recess 330a and a recess 330b of one of the adjacent inner wall parts 320 that is located on the first side in the circumferential direction. Thus, the folding line 120A between the first end part 121 and the first intermediate part 122 is arranged radially inside of the inner wall projection 333.

The second end part 125 and the second intermediate part 124 are arranged within the recess 230a and the recess 230b of one of the adjacent inner wall parts 220 that is located on the second side in the circumferential direction. Thus, the folding line 120D between the second end part 125 and the second intermediate part 124 is arranged radially inside of the inner wall projection 233. Further, the second end part 125 and the second intermediate part 124 are arranged within a recess 340a and a recess 340b of one of the adjacent inner wall parts 320 that is located on the second side in the circumferential direction. Thus, the folding line 120D between the second end part 125 and the second intermediate part 124 is arranged radially inside of the inner wall projection 343.

In this case, the inner wall projection 243 of the inner wall part 220 of the first assembly 200 and the inner wall projection 333 of the inner wall part 320 of the second assembly 300 restrict radially outward movement of the first end part 121. Further, the inner wall projection 233 of the inner wall part 220 of the first assembly 200 and the inner wall projection 343 of the inner wall part 320 of the second assembly 300 restrict radially outward movement of the second end part 125.

In this manner, radially outward movement of the first and second end parts 121, 125 (the slot insulation member 120) is restricted while a space is formed between the first end part 121 of the slot insulation member 120 and the second tooth tip part outer peripheral surface 114c of the tooth 112 arranged on the first side in the circumferential direction and between the second end part 125 of the slot insulation member 120 and the first tooth tip part outer peripheral surface 114b of the tooth 112 arranged on the second side in the circumferential direction.

Axial movement of the slot insulation member 120 is restricted by the inner wall part 220 of the first assembly 200 and the inner wall part 320 of the second assembly 300.

Specifically, axial movement of the first end part 121 is restricted by the second movement restriction surface 241 of the inner wall part 220 and the fourth movement restriction surface 341 of the inner wall part 320 that are arranged on the first side in the circumferential direction. Further, axial movement of the second end part 125 is restricted by the first movement restriction surface 231 of the inner wall part 220 and the third movement restriction surface 331 of the inner wall part 320 that are arranged on the second side in the circumferential direction.

Insertion of the interphase insulation member 170 into the slot 115 is now described with reference to FIGS. 5, 12 and 13.

The first end part 171 of the interphase insulation member 170 is arranged within a region defined by the first end part 121 of the slot insulation member 120 and the second tooth tip part outer peripheral surface 114c of one of the teeth 112 defining the slot 115, which is arranged on the first side in the circumferential direction. Further, the second end part 174 is arranged within a region defined by the second end part 125 of the slot insulation member 120 and the first tooth tip part outer peripheral surface 114b of one of the teeth 112 defining the slot 115, which is arranged on the second side in the circumferential direction. Further, the interphase insulation part (the first central part 172 and the second central part 173) is arranged between the winding parts 131 of different phases that are respectively wound around the teeth 112 adjacent to each other in the circumferential direction.

Figure 12:
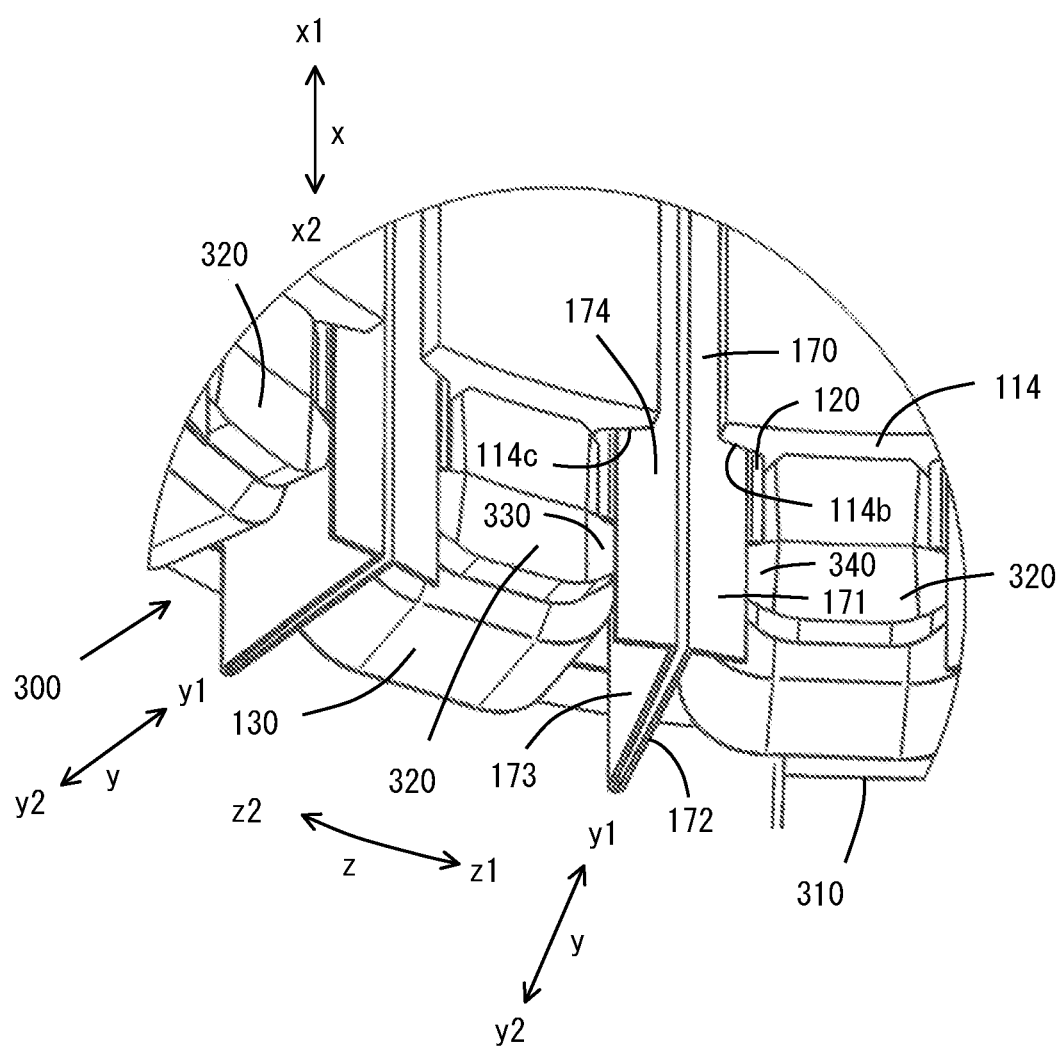
FIG. 12 is a perspective view illustrating how to insert the interphase insulation member into a slot.

When inserting the interphase insulation member 170 into the slot 115, the interphase insulation member 170 is folded such that the distance between the edges 170a and 170b is reduced as shown in FIG. 12.

In this state, from the edge on the first side in the axial direction (e.g. the edge 170c), the first and second end parts 171, 174 are respectively inserted between outer peripheral surfaces of the respectively corresponding inner wall parts 320 of the second assembly 300 and tooth tip part outer peripheral surfaces of the respectively corresponding teeth 112, and the interphase insulation part is inserted between the adjacent winding parts 131 of different phases.

Specifically, the first end part 171 is inserted between the outer peripheral surface 342 of the inner wall part 320 and the second tooth tip part outer peripheral surface 114c of the tooth 112 so as to be arranged radially inside the first end part 121 of the slot insulation member 120. Further, the second end part 174 is inserted between the outer peripheral surface 332 of the inner wall part 320 and the first tooth tip part outer peripheral surface 114b of the tooth 112 so as to be arranged radially inside the second end part 125 of the slot insulation member 120.

Further, the interphase insulation part is inserted between the winding parts 131 of different phases wound around the adjacent teeth 112 from between the adjacent inner wall parts 320.

The first end part 171 of the interphase insulation member 170 is arranged in a space defined by the tooth tip part outer peripheral surface 114c of the tooth 112 and the first end part 121 of the slot insulation member 120, and the second end part 174 of the interphase insulation member 170 is arranged in a space defined by the tooth tip part outer peripheral surface 114b of the tooth 112 and the second end part 125 of the slot insulation member 120. This arrangement enhances the insulation strength. For example, even if the interphase insulation member 170 is displaced (moved), a gap is prevented from being formed between the interphase insulation member 170 (the first end part 171, the second end part 174) and the slot insulation member 120 (the first end part 121, the second end part 125). Thus, insulation failure due to movement of the interphase insulation member 170 is prevented.

The operation of inserting the interphase insulation member 170 into the slot 115 along the axial direction is completed when the first end part 171 abuts on the second movement restriction surface 241 of the inner wall part 220 of the first assembly 200 that is arranged on the first side in the circumferential direction, or when the second end part 174 abuts on the first movement restriction surface 231 of the inner wall part 220 of the first assembly 200 that is arranged on the second side in the circumferential direction, as shown in FIG. 13.

Upon completion of insertion into the slot 115, external force for shortening the distance between the edges 170a and 170b is released, so that the interphase insulation member 170 returns to its original shape by elastic force. Specifically, the first end part 171 of the interphase insulation member 170 is arranged within the recess 240a of the inner wall part 220 arranged on the first side in the circumferential direction, and the second end part 174 is arranged within the recess 230a of the inner wall part 220 arranged on the second side in the circumferential direction.

Axial movement of the interphase insulation member 170 is restricted by the inner wall part 220 of the first assembly 200 and the inner wall part 320 of the second assembly 300. Specifically, axial movement of the first end part 171 is restricted by the second movement restriction surface 241 of the inner wall part 220 and the fourth movement restriction surface 341 of the inner wall part 320 that are arranged on the first side in the circumferential direction. Further, axial movement of the second end part 174 is restricted by the first movement restriction surface 231 of the inner wall part 220 and the third movement restriction surface 331 of the inner wall part 320 that are arranged on the second side in the circumferential direction.

In FIG. 5, the interphase insulation member 170 is inserted into the slot 115 such that the first end part 171 is arranged on the first side in the circumferential direction, while the second end part 174 is arranged on the second side in the circumferential direction. The inserting method of the interphase insulation member 170 is not limited to this. For example, the interphase insulation member 170 may be inserted into the slot 115 such that the first end part 171 is arranged on the second side in the circumferential direction, while the second end part 174 is arranged on the first side in the circumferential direction.

In this case, the end part 171 and the central part 172 correspond to the second end part and the second central part, respectively, and the end part 174 and the central part 173 correspond to the first end part and the first central part, respectively.

It may be desired to enhance the insulation strength along the axial direction by increasing the axial length of the interphase insulation member 170. For example, it may be desired to use an interphase insulation member 170 that is longer than the distance between the first and second assemblies 200, 300 arranged on the opposite sides of the stator core 100 in the axial direction in order to increase the insulation distance along the axial direction.

Figure 18:
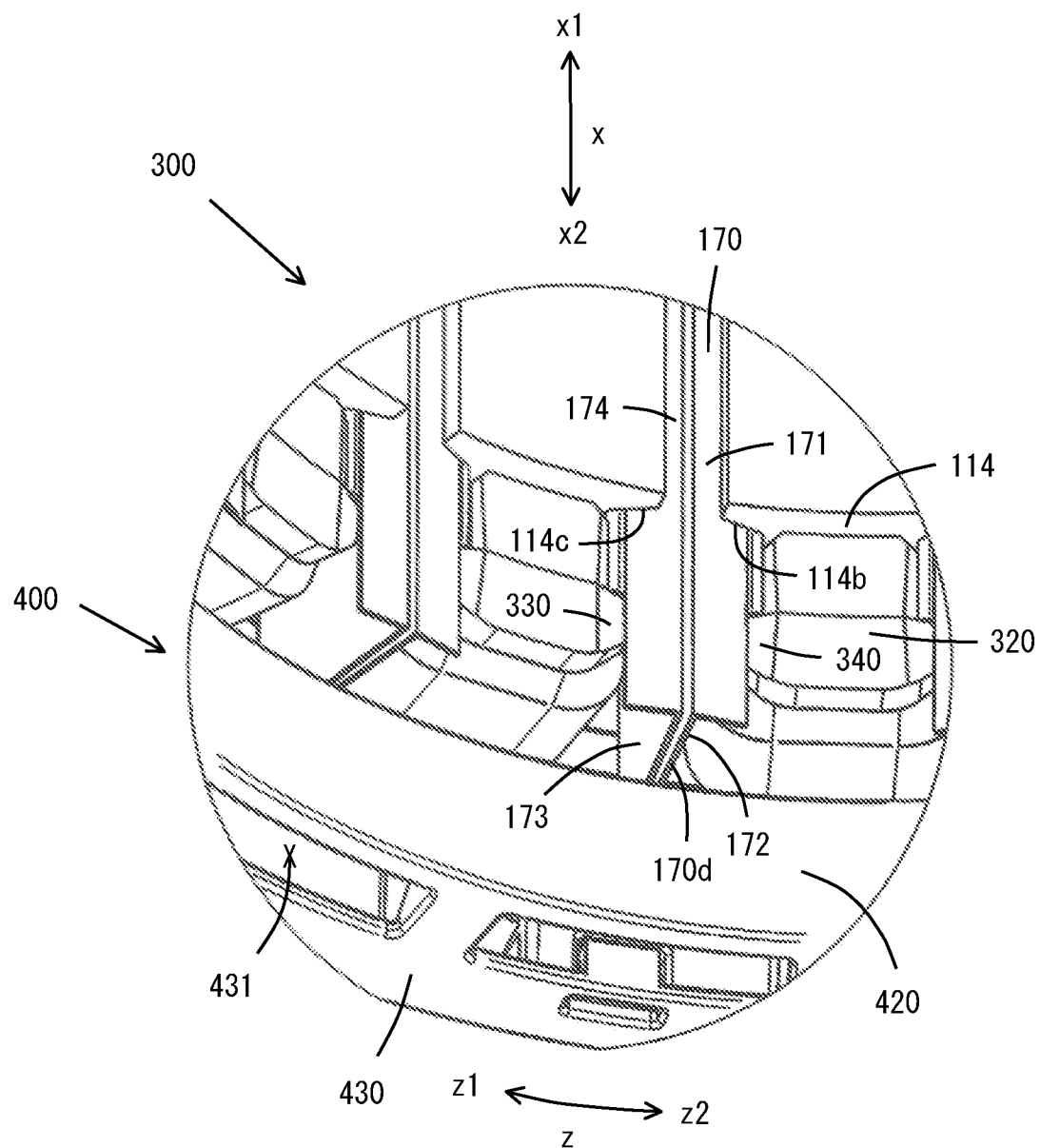
FIG. 18 is a perspective view showing the cover mounted to the second electrical insulator assembly.

Such an interphase insulation member 170 abuts on the first movement restriction surface 231 or the second movement restriction surface 241 that is formed in the inner wall part 220 of the first assembly 200, when inserted, for example, from the second assembly 300 side. At this time, as shown in FIG. 18, the interphase insulation member 170 protrudes from the second assembly 300 to the side opposite to the stator core 100 along the axial direction.

In this case, the insulation distance can be increased along the axial direction by the protruding length of the interphase insulation member 170 protruding from the second assembly 300 to the side opposite to the stator core 100 along the axial direction.

If the interphase insulation member 170 protrudes from the second assembly 300 to the side opposite to the stator core 100 along the axial direction, the interphase insulation member 170 does not abut on the third movement restriction surface 331 or the fourth movement restriction surface 341 that is formed in the inner wall part 320 of the second assembly 300. Therefore, the interphase insulation member 170 may move to the second side in the axial direction.

In this embodiment, movement of the interphase insulation member 170 to the second side in the axial direction is restricted by the cover 400 being mounted onto the second assembly 300.

Figure 14:
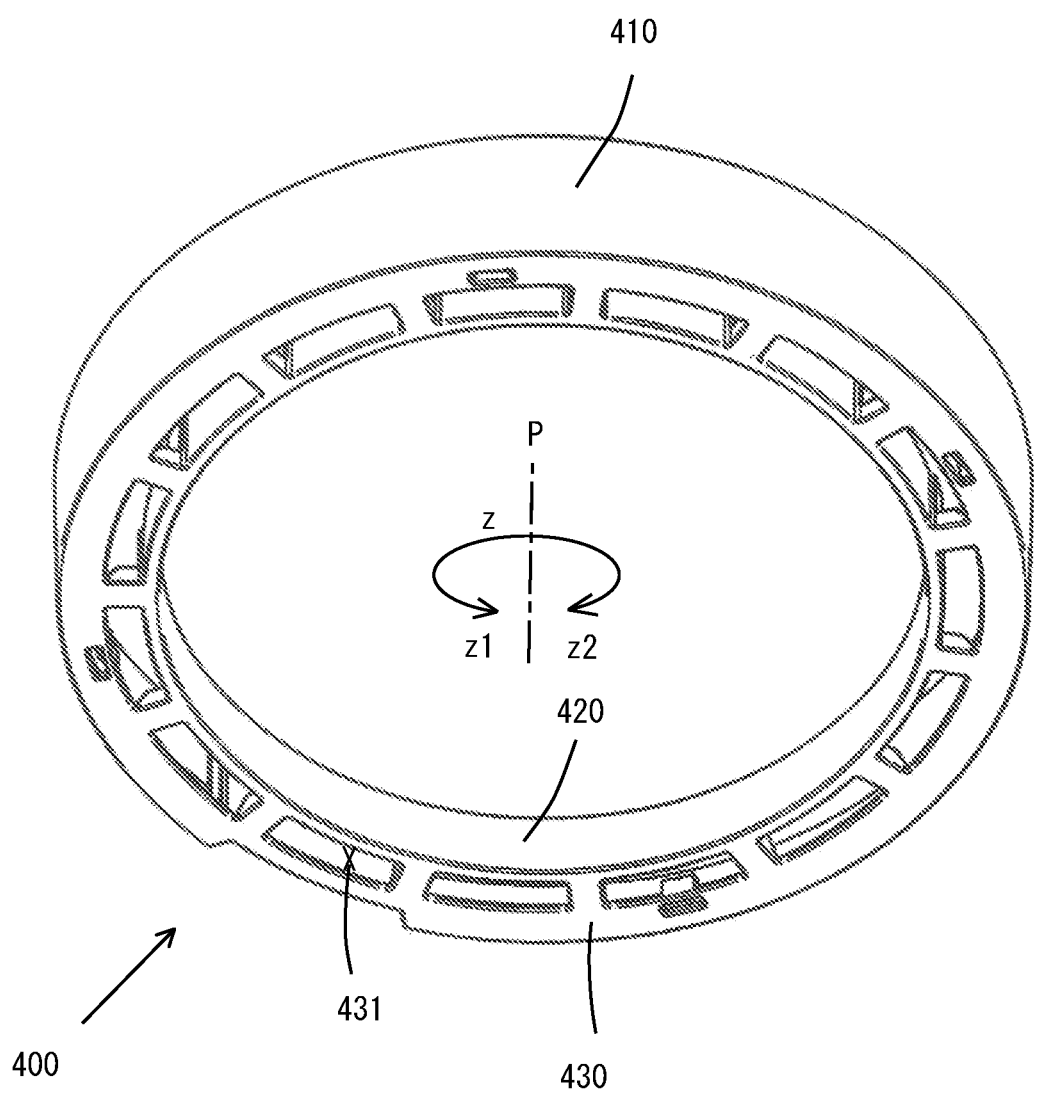
FIG. 14 is a perspective view of a cover of the stator used in the motor according to the first embodiment.
Figure 15:
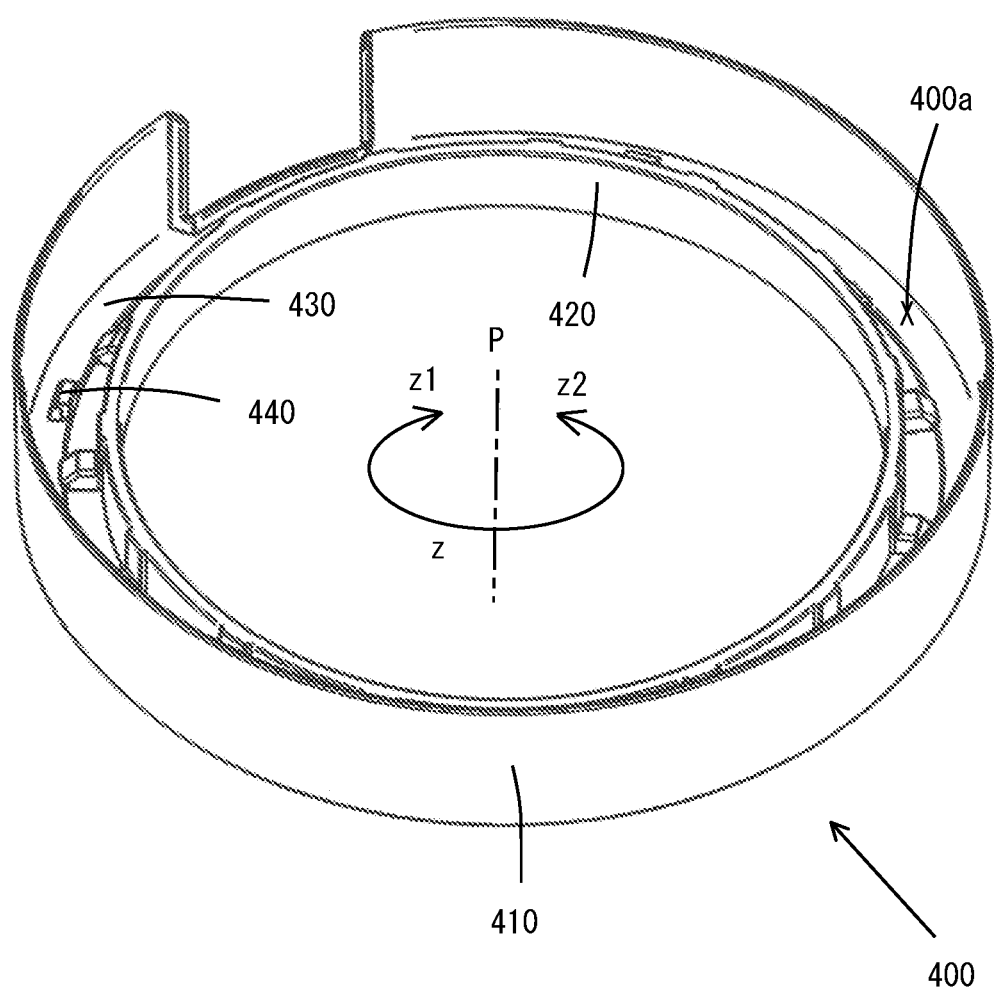
FIG. 15 is a perspective view of the cover of the stator used in the motor according to the first embodiment, as viewed from the back.
Figure 16:
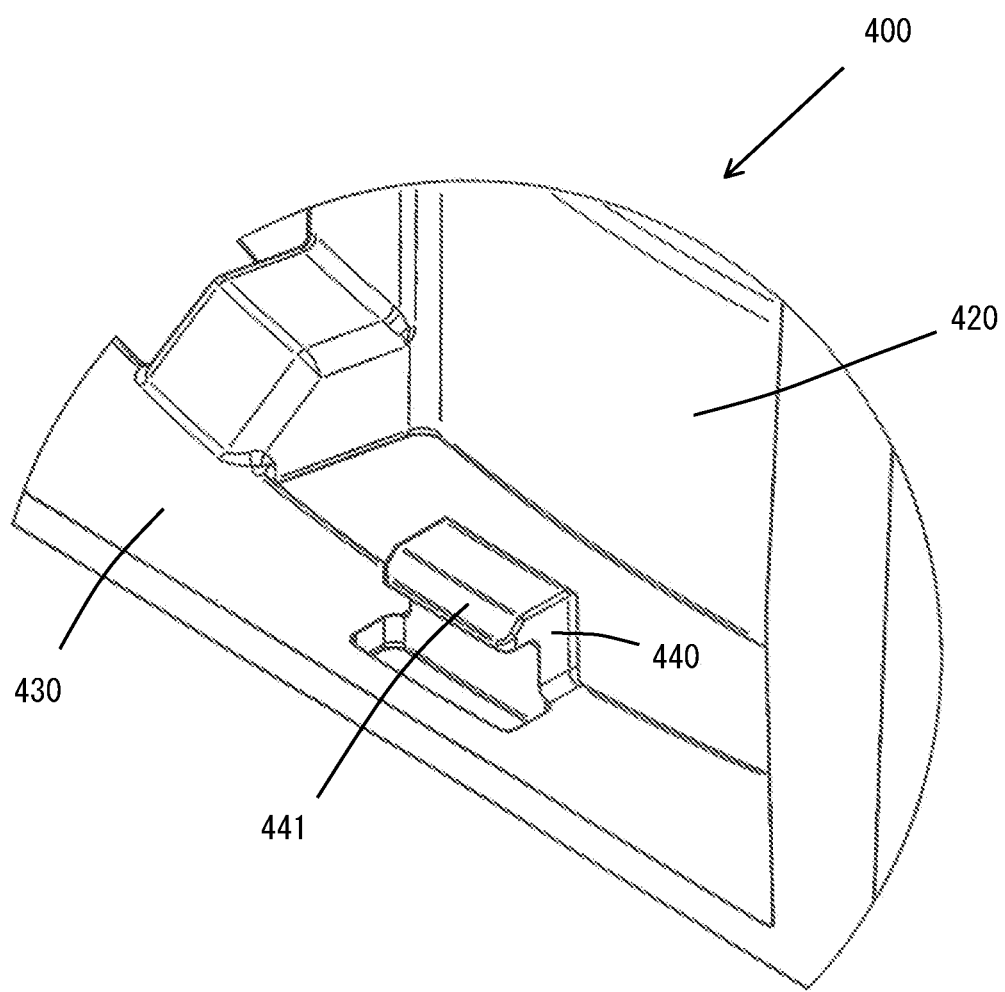
FIG. 16 is a perspective view of a locking piece of the cover of the stator used in the motor according to the first embodiment.

As shown in FIGS. 14, 15 and 16, the cover 400 has an outer peripheral wall 410, an inner peripheral wall 420 and a bottom wall 430.

The outer peripheral wall 410 has an outer peripheral surface and an inner peripheral surface and extends in the circumferential direction and the axial direction.

The inner peripheral wall 420 is arranged radially inside of the outer peripheral wall 410 and has an outer peripheral surface and an inner peripheral surface and extends in the circumferential direction and the axial direction.

The bottom wall 430 extends in the circumferential direction and the radial direction between the outer peripheral wall 410 and the inner peripheral wall 420.

The outer peripheral wall 410, the inner peripheral wall 420 and the bottom wall 430 define a recess 400a extending in the circumferential direction.

The cover 400 has at least one communication hole for communication between the inside and the outside. In this embodiment, communication holes 431 are formed in the bottom wall 430. Provision of the communication holes 431 suppresses a temperature rise within the cover 400.

Further, a mounting mechanism for mounting the cover 400 onto the second assembly 300 is provided.

In this embodiment, the mounting mechanism has at least one set of an engagement piece 440 and an engagement recess 360 configured to be engaged with the engagement piece.

Figure 17:
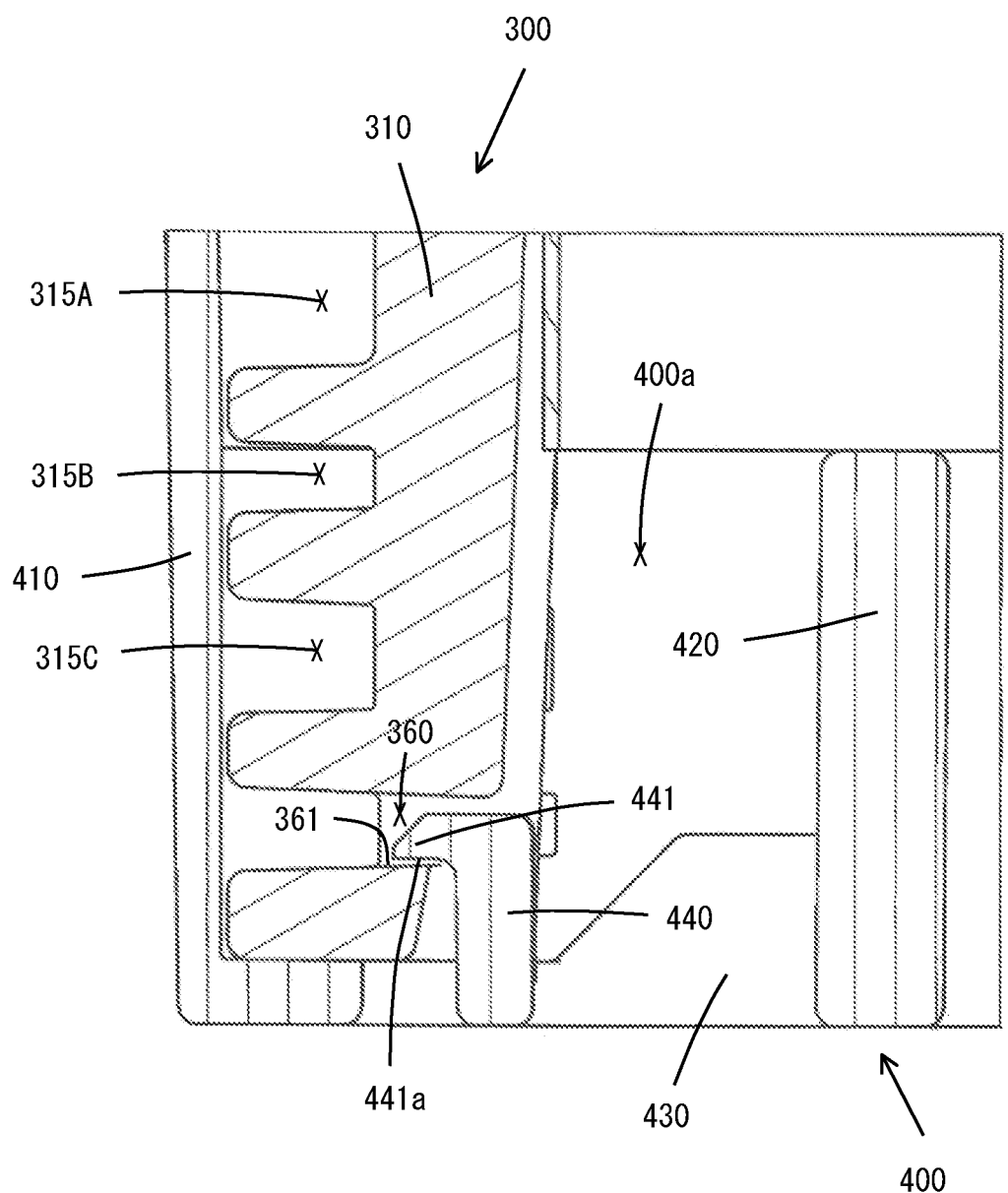
FIG. 17 is a sectional elevational view of a mounting mechanism for mounting the cover to the second electrical insulator assembly.

As shown in FIG. 4, the engagement recess 360 is formed in the inner peripheral surface 311 of the outer wall part 310 of the second assembly 300. The engagement recess 360 is defined by an engagement recess forming face 361 (FIG. 17). As shown in FIG. 16, the engagement piece 440 is formed on the back side of the bottom wall 430 (within the recess 400a) of the cover 400. The engagement piece 440 has a claw 441 configured to be engaged with the engagement recess 360. The claw 441 has a locking face 441a configured to be locked to the engagement recess forming face 361 that defines the engagement recess 360.

In this embodiment, a plurality of engagement recesses 360 are formed along the circumferential direction in the inner peripheral surface 311 of the outer wall part 310 of the second assembly 300. Further, a plurality of engagement pieces 440 are formed along the circumferential direction within the recess 400a of the cover 400.

In order to mount the cover 400 onto the second assembly 300, the outer peripheral wall 410 of the cover 400 is placed on the outside of the outer wall part 310 of the second assembly 300 and then the cover 400 is moved to the first side in the axial direction. At this time, the claw 441 of the engagement piece 440 is inserted into the engagement recess 360 from the inside in the radial direction by elastic force of the engagement piece 440. Thus, as shown in FIG. 17, the locking face 441a of the claw 441 is locked to the engagement recess forming face 361.

The outer peripheral wall 410 of the cover 400 covers the crossover wire guided along the outer peripheral surface 312 of the outer wall part 310 when arranged on the outside of the outer wall part 310 of the second assembly 300. This prevents the crossover wire from coming into contact with other parts and thus enhances the electrical insulating properties.

The tension of the crossover wire guided along the outer peripheral surface 312 of the outer wall part 310 acts to contract (reduce) the diameter of the outer wall part 310. On the other hand, a force of engagement between the engagement piece 440 (the locking face 441a of the claw 441) and the engagement recess 360 (the engagement recess forming face 361) acts to expand the diameter of the outer wall part 310. Therefore, the tension of the crossover wire guided along the outer peripheral surface 312 of the outer wall part 310 can be enhanced (increased) without reducing the strength of the outer wall part 310.

Figure 24:
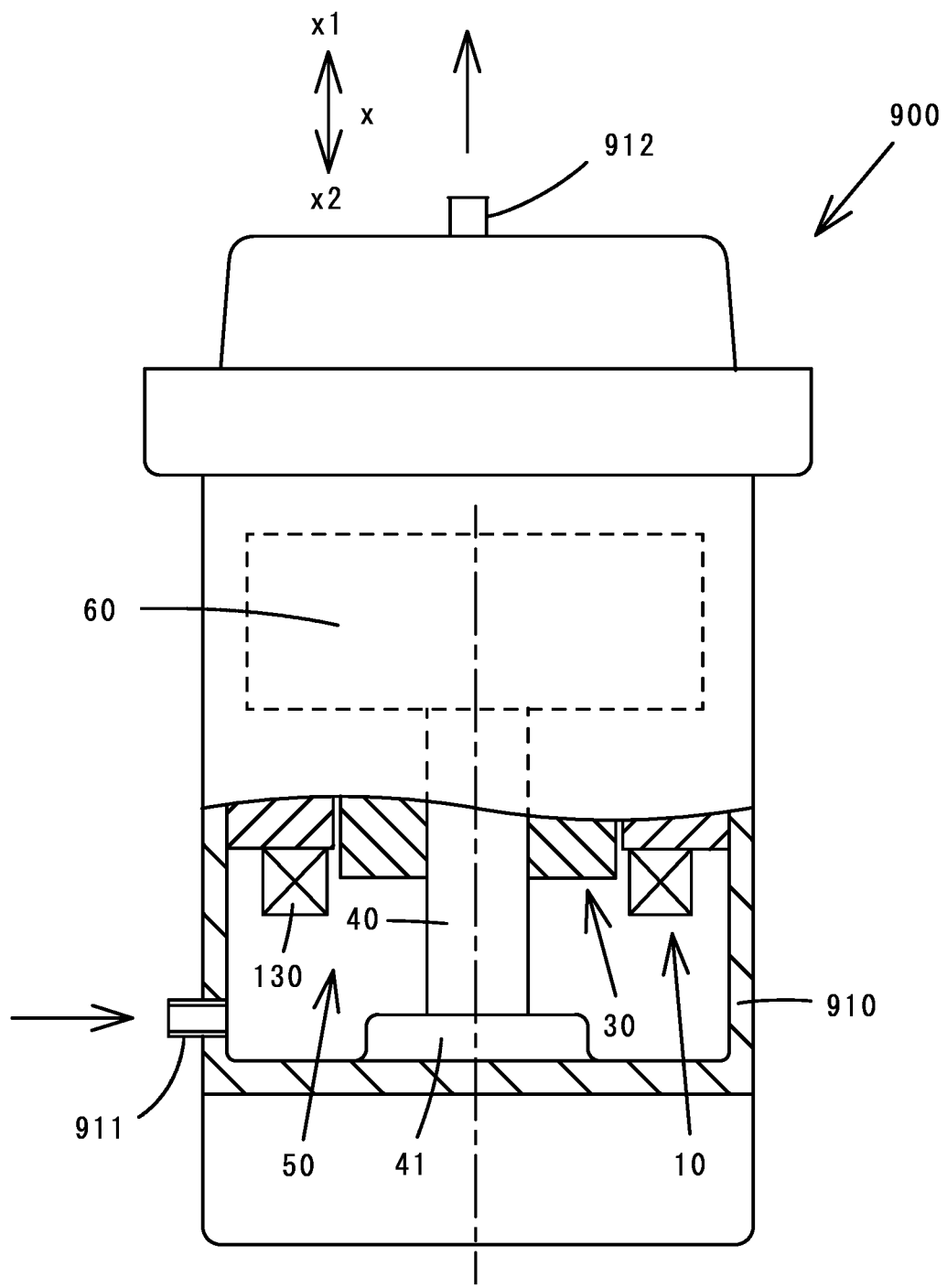
FIG. 24 is a schematic view showing a compressor according to one embodiment of the present disclosure.

The shape of the bottom wall 430 can be appropriately selected. In this embodiment, the bottom wall 430 is configured such that, with the cover 400 mounted onto the second assembly 300, when viewed from the first side in the axial direction (the side opposite to the stator core 100), part of the winding part 131 is covered by the bottom wall 430 on the outside of the inner peripheral wall 420 in the radial direction, while another part of the winding part 131 is exposed on the inside of the inner peripheral wall 420 in the radial direction. This prevents interference of a jig (with the winding part 131) when the stator 10 is assembled to (with) a compressor 900, as shown in FIG. 24. Further, this configuration enhances the effect of cooling the winding part 131.

Movement of the interphase insulation member 170 to the second side in the axial direction is restricted by the cover 400 being mounted onto the second assembly 300.

Where the interphase insulation member 170 to be used has a length not protruding from the first assembly 200 or the second assembly 300 to the side opposite to the stator core 100, the cover 400 for restricting movement of the interphase insulation member 170 can be omitted.

Even in such a case, however, if the cover 400 is mounted onto the second assembly 300, the crossover wire guided along the outer peripheral surface 312 of the outer wall part 310 of the second assembly 300 can be prevented from coming into contact with other parts.

Where the stator winding 130 is formed by star-connected first to third phases (e.g., U-, V- and W-phases) of stator winding portions, ends of the stator winding portions of the first to third phases on the neutral point connection side are connected in common to the neutral point and joined, for example, by welding.

In this case, the common connection part (neutral point) is covered with an insulation member and guided along the circumferential direction within the recess 200a of the first assembly 200.

Even if the common connection part is covered with an insulation member, however, other parts such as a lead wire may be damaged due to contact with the common connection part.

In this embodiment, damage to other parts due to contact with the common connection part is prevented by a particular arrangement of the common connection part covered with an insulation member.

One example of arrangement of the common connection part is shown in FIG. 20.

The stator winding portions of U-, V- and W-phases respectively have the power supply side lead wires that are connected to a power supply and the neutral point side lead wires that are connected to a neutral point. In FIG. 20, only the neutral point side lead wires 130Ub, 130Vb, 130Wb of the stator winding portions of U-, V- and W-phases are shown.

The power supply side lead wires are covered with an insulation member and guided along the circumferential direction within the recess 200a of the first assembly 200. In FIG. 20, only insulation members 160U, 160V covering the power supply side lead wires of U- and V-phases are shown, and an insulation member covering the power supply side lead wires of W-phase is not shown (is hidden). An insulation tube having electrical insulating properties, for example, is used as the insulation members 160U, 160V.

Further, the neutral point side lead wires 130Ub, 130Vb, 130Wb are connected in common and joined, for example, by thermal welding, and thereby form the common connection part (neutral point). The common connection part is covered with an insulation member 140.

Figure 19A:
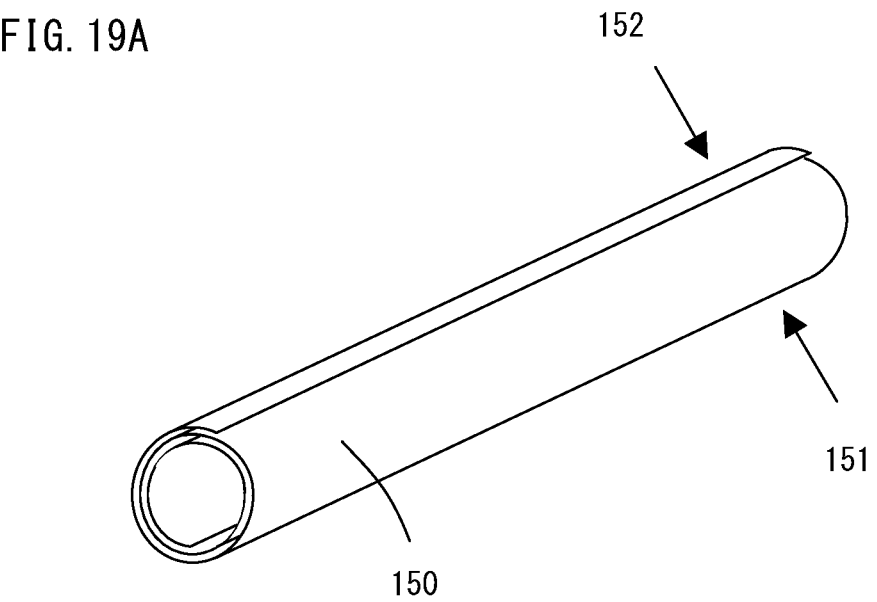
FIG. 19A is a perspective view of a resin film rolled into a tube.
Figure 19B:
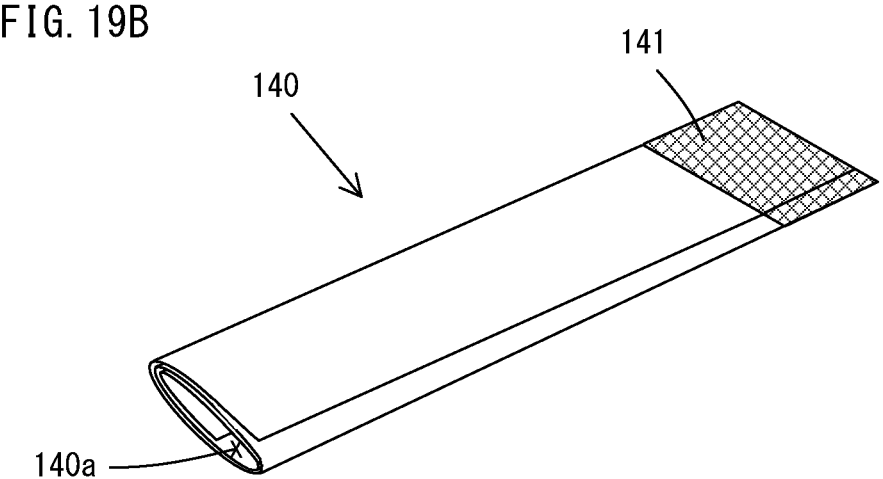
FIG. 19B is a perspective view of an insulation member for covering a neutral point formed from the resin film of FIG. 19A.

As shown in FIGS. 19A and 19B, for example, the insulation member 140 is formed of a resin film 150 having electrical insulating properties.

First, as shown in FIG. 19A, the resin film 150 is rolled into a tubular form.

Then, parts of the resin film shown by arrows 151, 152 are joined, for example, by ultrasonic welding. Thus, as shown in FIG. 19B, the insulation member 140 is formed by a tubular body having a joint part 141 on one end and an opening 140a on the other end.

The common connection part is inserted into the insulation member 140 via the opening 140a.

Further, the common connection part covered with the insulation member 140 is mounted on at least one of the insulation members covering the power supply side lead wires, for example, on the insulation members 160U, 160V as shown in FIG. 20. In this state, the insulation members 140, 160 are bound together with the binding string 180. At this time, the thin parts 215 and the communication holes 216, which are described above and shown in FIG. 13, are utilized to prevent the binding string 180 from projecting outward from the outer peripheral surface 212 of the outer wall part 210.

Figure 21:
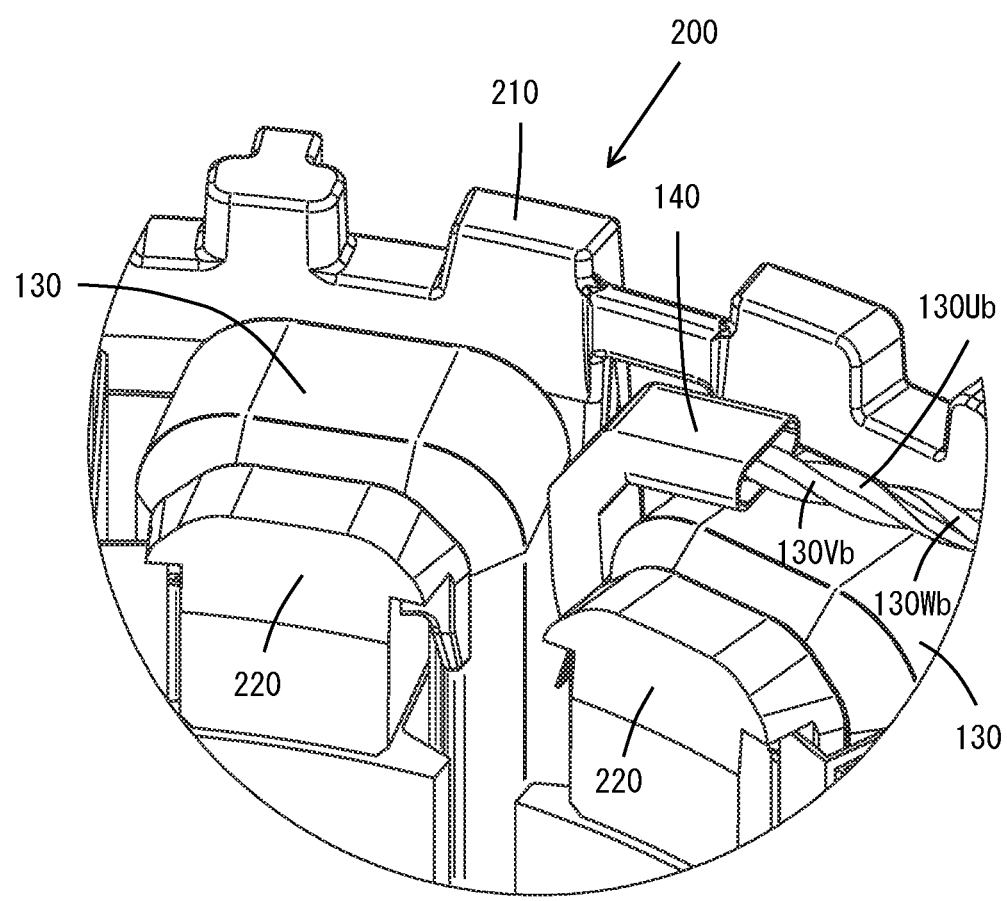
FIG. 21 is a perspective view of another example of an arrangement of the insulation member that covers the neutral point.

Another example of arrangement of the neutral point side lead wires is shown in FIG. 21.

In FIG. 21, the neutral point side lead wires 130Ub, 130Vb, 130Wb are connected in common and joined and thereby form the common connection part. The common connection part is covered with an insulation member 140.

The common connection part covered with the insulation member 140 is arranged between the winding parts respectively wound around the teeth 112 adjacent in the circumferential direction.

Where the interphase insulation member 170 is arranged between the winding parts respectively wound around the teeth 112 adjacent in the circumferential direction, the common connection part may be arranged in the interphase insulation member 170 (between the first central part 172 and the second central part 173).

In the motor according to the first embodiment, processing of the end parts of the stator winding portions is performed on the first assembly 200 side, and wire processing of the crossover wires is performed on the second assembly 300 side, but this is not limitative.

Figure 22:
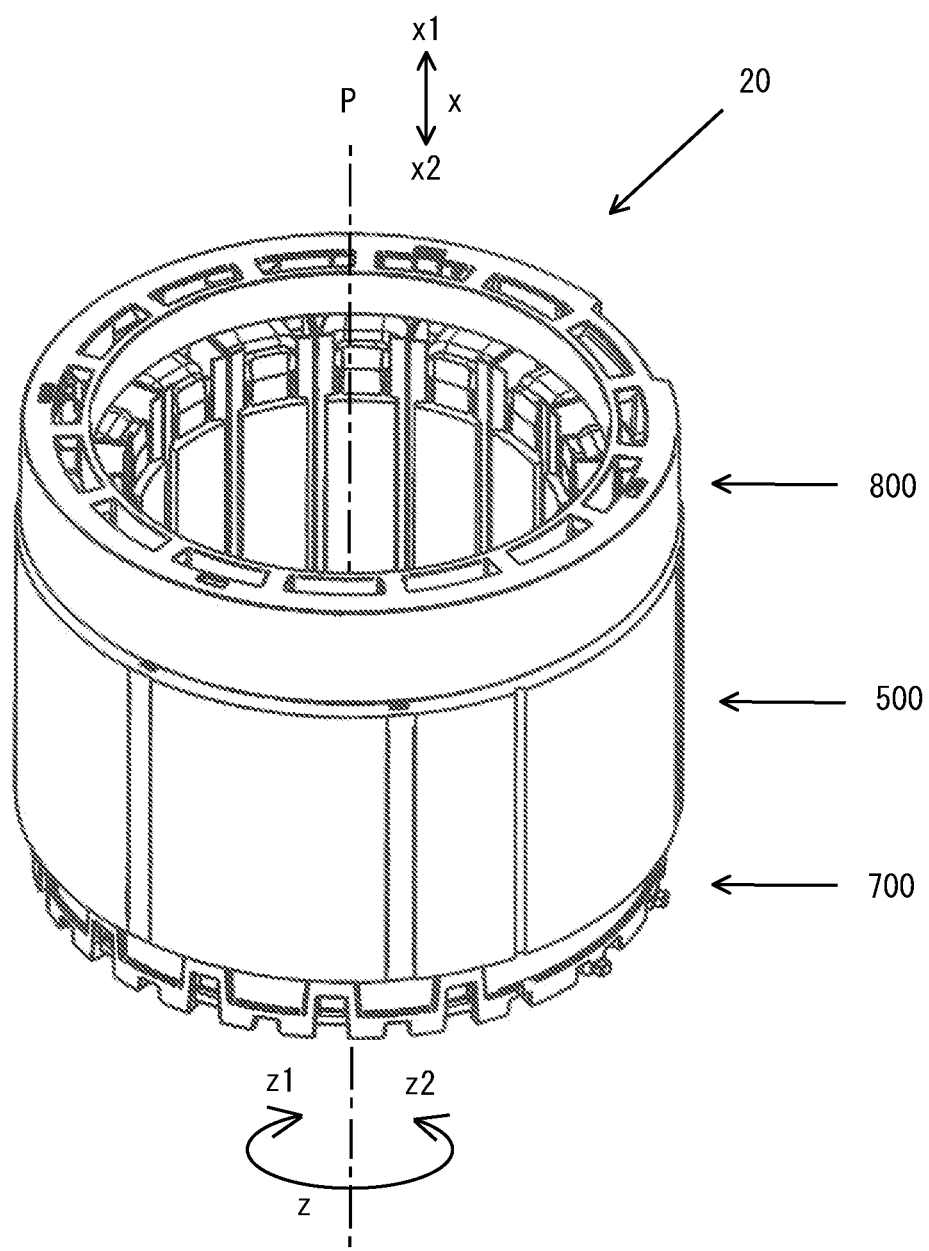
FIG. 22 is a perspective view of a stator used in a motor according to a second embodiment of the present disclosure.
Figure 23:
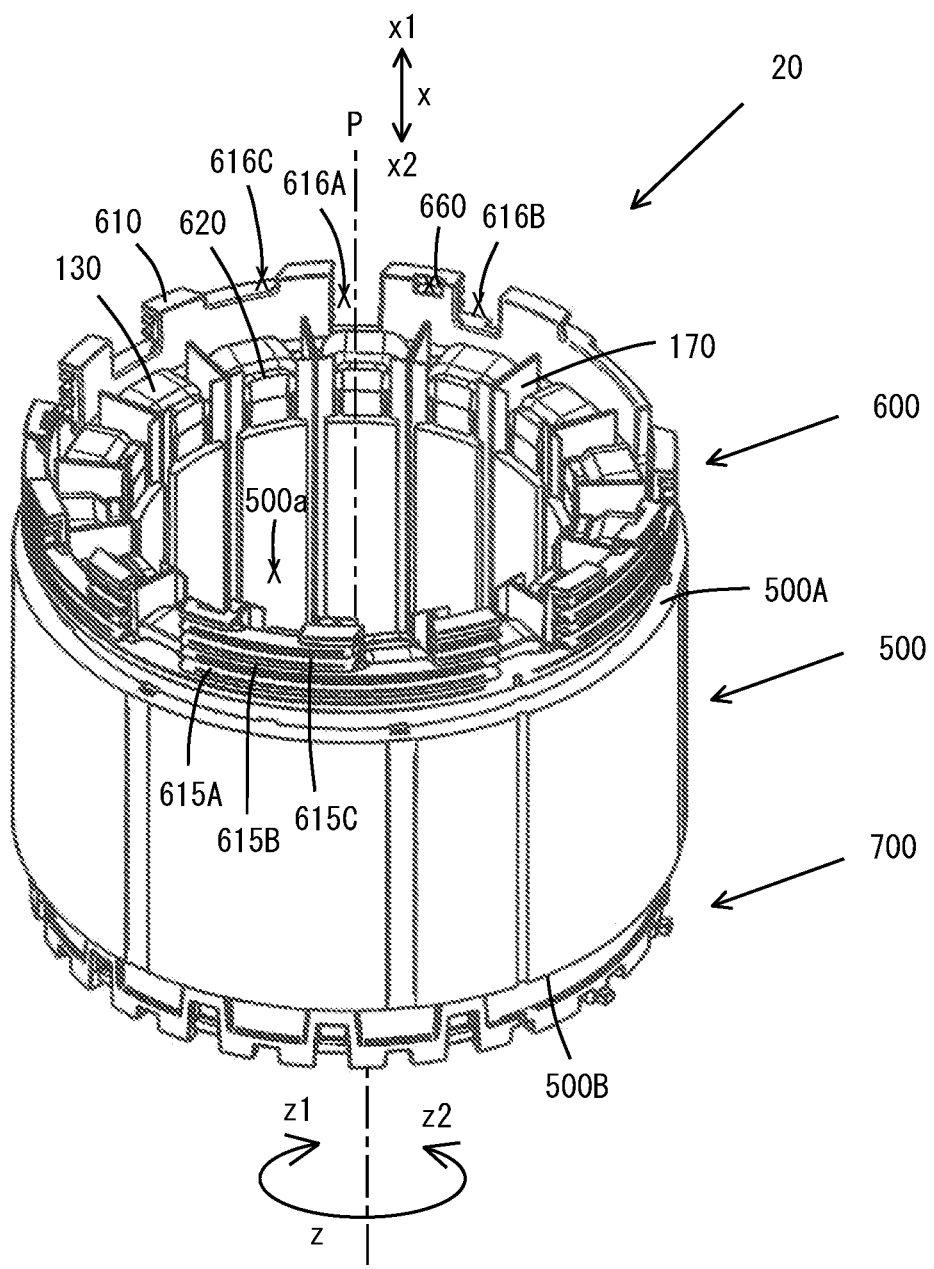
FIG. 23 is a perspective view of the stator shown in FIG. 22, with a cover removed.

A motor according to a second embodiment of the present disclosure is shown in FIGS. 22 and 23.

A stator 20 that forms the motor of the second embodiment includes a stator core 500, first and second assemblies 600 and 700 respectively arranged on the first and second sides of the stator core 500 in the axial direction, and a cover 800 mounted on the first assembly 600.

In this embodiment, processing of the end parts of the stator winding portions and wiring processing of the crossover wires are performed on the first assembly 600 side. Specifically, notches 616A, 616B, 616C are formed by notching an outer wall part 610 of the first assembly 600, and guide grooves 615A, 615B, 615C are formed in an outer peripheral surface of the outer wall part 610.

These processings are performed in the same manner as in the first embodiment, and therefore not described.

Next, a compressor 900 according to one embodiment of the present disclosure is described with reference to FIG. 24.

The compressor 900 includes a motor 50 and a compression mechanism 60. The compressor 900 of this embodiment uses the above-described motor 50 of the first embodiment of this disclosure. The motor 50 and the compression mechanism 60 are disposed within a closed container 910. A suction port (pipe) 911 and a discharge port (pipe) 912 are provided in the closed container 910.

The motor 50 includes the above-mentioned stator 10 and a rotor 30. The rotor 30 includes a rotating shaft 40.

The compressor mechanism 60 compresses refrigerant sucked through the suction port 911 and discharges it from the discharge port 912, by rotation of the rotating shaft 40.

Known compression mechanism of various configurations can be used as the compression mechanism 60. The motor 50 and the compression mechanism 60 can be arranged either along the vertical direction or along the horizontal direction.

The motor having the stator 20 according to the second embodiment can also be used as the motor for driving the compression mechanism 60.

The present disclosure is not limited to the structures described in the above embodiment, but rather, may be added to, changed, replaced with alternatives or otherwise modified.

The first and second electrical insulator assemblies are not limited to those described in this embodiment. For example, the material and shape of the first and second electrical insulator assemblies may be appropriately changed. The inner wall projection may be formed on one or both of the inner wall parts of the first and second electrical insulator assemblies. The notches and the guide grooves may be formed in both of the outer wall parts of the first and second electrical insulator assemblies, and may just be formed in at least one of the outer wall parts of the first and second electrical insulator assemblies.

The first to fourth inner wall projections are provided, but the number of the inner wall projections may be appropriately changed. For example, only the first and second inner wall projections or only the third and fourth inner wall projections may be provided, or the inner wall projections may be omitted The slot insulation member is not limited to that described in this embodiment. For example, the material and shape of the slot insulation member may be appropriately changed.

The interphase insulation member is not limited to that described in this embodiment. For example, the material and shape of the interphase insulation member may be appropriately changed.

The cover is not limited to that described in this embodiment. For example, the material and shape of the cover may be appropriately changed. The cover may be omitted.

Any of the technical features of the above embodiment may be used separately or in combination of appropriately selected ones.

The present disclosure may also be configured as a stator, a motor having a stator, or a compressor using a motor as a driving source.

DESCRIPTION OF THE REFERENCE NUMERALS

10, 20: stator
30: rotor
40: rotating shaft
41: bearing
50: motor
60: compression mechanism
100, 500: stator core
100*a*, 500*a*: stator core inner space
100A, 100B, 500A, 500B: stator core end surface
111: yoke
111*a*: yoke inner peripheral surface
112: tooth
113: tooth base part
113*a*, 113*b*: tooth base part side surface (tooth side surface)
114: tooth tip part
114A, 114B: tooth projection
114*a*: tooth tip part inner peripheral surface
114*b*, 114*c*: tooth tip part outer peripheral surface
120: slot insulation member
120*a* to 120*d*: edge
120A to 120D: folding line
121, 125: end part
122, 124: intermediate part
123: central part
130: stator winding
130Ub, 130Vb, 130Wb: the other end part (neutral point side end part) of stator winding portion
131: winding part
132: lead wire
132*a*: winding start wire
132*b*: winding end wire
140: insulation member
140*a*: opening
141: joint part
150: resin film
160U, 160V: insulation member
170: interphase insulation member
170*a* to 170*d*: edge 170A to 170C: folding line
171, 174: end part
172, 173: central part
180: binding string
200, 300, 600, 700: electrical insulator assembly
200a, 300a: recess
210, 310, 610: outer wall part
211, 311: inner peripheral surface
212, 312: outer peripheral surface
212m, 221m, 312m, 321m: inclined surface
213: groove
213a, 213b: side wall
213c: bottom wall
215: thin part
216: communication hole
220, 320, 620: inner wall part
221, 321: inner peripheral surface
222, 322: outer peripheral surface
230, 240, 330, 340: flange
231, 241, 331, 341: movement restriction surface (axial movement restriction surface)
232, 242, 332, 342: outer peripheral surface
233, 243, 333, 343: inner wall projection
233a, 243a, 333a, 343a: end surface (axial movement restriction surface)
233b, 243b, 333b, 343b: side surface
230a, 240a, 330a, 340a: recess
230b, 240b, 330b, 340b: recess
250, 350: connection part
250A, 350A: electrical insulator assembly end surface
251, 351: top surface
252, 253, 352, 353: side surface
254, 255, 354, 355: groove
254a, 354a: projection
256, 257, 356, 357: stepped surface
315A to 315C, 615A to 615C: guide groove
316, 316A to 316C, 616A to 616C: notch
316a, 316b: side wall
316c: bottom wall
360, 660: engagement recess
361: engagement recess forming face (engagement face)
400, 800: cover
400a: recess
410: outer peripheral wall
420: inner peripheral wall
430: bottom wall
431: communication hole
440: engagement piece
441: claw
441a: locking face
900: compressor
910: closed container
911: suction port
912: discharge port

What is claimed is:

1. A motor comprising:
a stator; and
a rotor that is rotatable relative to the stator;
the stator having a stator core, first and second electrical insulator assemblies and a stator winding,
the stator core having a yoke extending annularly around an axis of the stator core and a plurality of teeth extending radially inward from the yoke,
the first electrical insulator assembly being arranged on a first stator core end surface on a first side of the stator core in an axial direction and the second electrical insulator assembly being arranged on a second stator core end surface on a second side of the stator core in the axial direction,
each of the first electrical insulator assembly and the second electrical insulator assembly having an outer wall part extending in a circumferential direction and facing the yoke, and extending parts extending radially inward from the outer wall part such that the extending parts respectively face the teeth,
the stator winding having a plurality of phase windings,
each of the phase windings having a plurality of winding portions,
each of the winding portions having a winding part wound, in a state in which the first and second electrical insulator assemblies have been respectively disposed on the first and second stator core end surfaces in the axial direction, starting adjacent to the outer wall part of one of the first electrical insulator assembly and the second electrical insulator assembly, around one of the teeth of the stator core, and
first and second wire extensions continuously extending from a first end and a second end of each of the winding parts, respectively,
wherein:
the outer wall part of at least one of the first and second electrical insulator assemblies has a radial thickness and includes a plurality of notches extending radially therethrough, the notches being configured to guide the respective wire extensions between an inner peripheral surface and an outer peripheral surface of the outer wall part,
the outer peripheral surface of the outer wall part has inclined surfaces that are adjacent to each of the notches on at least one of a first and second sides in a circumferential direction of the yoke,
an outer diameter of each of the inclined surfaces gradually decreases such that the radial thickness of the outer wall part gradually decreases toward the respective notch along the inclined surface,
at least one of the first wire extensions is a winding start wire,
at least one of the second wire extensions is a winding end wire, and
each of the second wire extensions of the winding parts except the winding end wire passes radially outward through one of the notches and along the inclined surface adjacent to the one of the notches, or each of the first wire extensions of the winding parts except the winding start wire passes radially outward through another one of the notches and along the inclined surface adjacent to the another one of the inclined notches.

2. The motor as defined in claim 1, wherein
the stator has a cover that is removably mounted onto at least one of the first electrical insulator assembly and the second electrical insulator assembly,
the cover has an outer peripheral wall that extends in the circumferential direction and is arranged outside of the outer peripheral surface of the outer wall part, an inner peripheral wall that extends in the circumferential direction and faces the inner peripheral surface of the outer peripheral wall in the radial direction, and a bottom wall that connects the outer peripheral wall and the inner peripheral wall, and
a first portion of the winding part is covered by the bottom wall on the outside of the inner peripheral wall in the radial direction, while a second portion of the winding part is exposed on the inside of the inner peripheral wall in the radial direction.

3. The motor as defined in claim 2, wherein the bottom wall has a through hole formed therethrough in the axial direction.

4. The motor as defined in claim 2, further comprising:
an interphase insulation member provided between two of the winding parts of different phase windings that are adjacent to each other, within a slot defined between two of the teeth that are adjacent to each other,
wherein movement of the interphase insulation member toward the at least one electrical insulator assembly in the axial direction is restricted by the inner peripheral wall of the cover.

5. The motor as defined in claim 1, wherein
grooves extend radially through the outer wall part of at least one of the first and second electrical insulator assemblies,
the winding start wire is covered with an insulation tube,
the winding start wire and the insulation tube are drawn out from the inner peripheral surface side to the outer peripheral surface side of the outer wall part via one of the grooves and drawn back from the outer peripheral surface side to the inner peripheral surface side of the outer wall part via another one of the grooves, and
the drawn-back winding start wire and the insulation tube overlap with the winding part in the axial direction.

6. The motor as defined in claim 1, wherein
the stator winding is formed by first, second and third phase windings which are star-connected,
a neutral point of the first, second and third phase windings is covered with an insulation member, and
the insulation member is attached to the insulation tube.

7. The motor as defined in claim 1, wherein
the stator winding is formed by first, second and third phase windings which are star-connected,
a neutral point of the first, second and third phase windings is covered with an insulation member, and
the insulation member is arranged between two of the winding portions that are adjacent to each other.

8. A compressor having:
a compression mechanism configured to compress refrigerant, and
the motor according to claim 1 configured to drive the compression mechanism.

9. The motor as defined in claim 1, wherein
grooves extend radially through the outer wall part of at least one of the first and second electrical insulator assemblies, and
the winding start wire is drawn out from the inner peripheral surface side to the outer peripheral surface side of the outer wall part via one of the grooves and drawn back from the outer peripheral surface side to the inner peripheral surface side of the outer wall part via another one of the grooves.

10. The motor as defined in claim 1, wherein
grooves extend radially through the outer wall part of at least one of the first and second electrical insulator assemblies,
the winding start wire is covered with an insulation tube, and
the winding start wire and the insulation tube are drawn out from the inner peripheral surface side to the outer peripheral surface side of the outer wall part via one of the grooves and drawn back from the outer peripheral surface side to the inner peripheral surface side of the outer wall part via another one of the grooves.

11. The motor as defined in claim 1, wherein portions of the inner peripheral surface of the outer wall part that are radially inward of the inclined surfaces of the outer peripheral surface of the outer wall part have a constant inner diameter.

12. The motor as defined in claim 1, wherein the plurality of notches comprises at least three pairs of first, second and third types of notches that have different axial depths.

13. The motor as defined in claim 12, wherein
the winding parts comprise at least a pair of U-phase winding parts, a pair of V-phase winding parts and a pair of W-phase winding parts,
at least one of the first wire extensions of the U-phase winding parts is a U-phase winding start wire,
at least one of the second wire extensions of the U-phase winding parts is a U-phase winding end wire,
at least one of the first wire extensions of the V-phase winding parts is a V-phase winding start wire,
at least one of the second wire extensions of the V-phase winding parts is a V-phase winding end wire,
at least one of the first wire extensions of the W-phase winding parts is a W-phase winding start wire,
at least one of the second wire extensions of the W-phase winding parts is a W-phase winding end wire,
the second wire extension of the U-phase winding parts that is not the U-phase winding end wire passes radially outward through one of the first type of notches and along the inclined surface adjacent to the one of the first type of notches, and/or the first wire extension of the U-phase winding parts that is not the U-phase winding start wire passes radially outward through the other of the first type of notches and along the inclined surface adjacent to the other of the first type of notches,
the second wire extension of the V-phase winding parts that is not the V-phase winding end wire passes radially outward through one of the second type of notches and along the inclined surface adjacent to the one of the second type of notches, and/or the first wire extension of the V-phase winding parts that is not the V-phase winding start wire passes radially outward through the other of the second type of notches and along the inclined surface adjacent to the other of the second type of notches, and
the second wire extension of the W-phase winding parts that is not the W-phase winding end wire passes radially outward through one of the third type of notches and along the inclined surface adjacent to the one of the third type of notches, and/or the first wire extension of the W-phase winding parts that is not the W-phase winding start wire passes radially outward through the other of the third type of notches and along the inclined surface adjacent to the other of the third type of notches.

14. The motor as defined in claim 13, wherein
first, second and third sets of guide grooves extend circumferentially along the outer peripheral surface of the outer wall part at different axial depths,
the second wire extension of one of the U-phase winding parts that is not the U-phase winding end wire is held in the first set of guide grooves,
the second wire extension of one of the V-phase winding parts that is not the V-phase winding end wire is held in the second set of guide grooves, and the second wire extension of one of the W-phase winding parts that is not the W-phase winding end wire is held in the third set of guide grooves.

15. The motor as defined in claim 14, wherein
the first type of notches and the first set of guide grooves have the same axial depth,
the second type of notches and the second set of guide grooves have the same axial depth, and
the third type of notches and the third set of guide grooves have the same axial depth.

16. The motor as defined in claim 1, wherein:
each of the inclined surfaces is straight in cross section perpendicular to the axial direction; or
each of the inclined surfaces is curved in cross section perpendicular to the axial direction.

17. A motor comprising:
a stator core having a yoke extending annularly around an axis of the stator core and teeth extending radially inward from the yoke;
a first electrical insulator assembly arranged on a first end surface on a first side of the stator core in an axial direction that is parallel to the axis of the stator core;
a second electrical insulator assembly arranged on a second end surface on a second side of the stator core in the axial direction, each of the first and second electrical insulator assemblies having an outer wall extending in a circumferential direction and facing the yoke, and extending parts extending radially inward from the outer wall such that the extending parts respectively face the teeth;
coils respectively wound around the teeth in a state in which the first and second electrical insulator assemblies have been respectively disposed on the first side and second side of the stator core in the axial direction; and
a rotor rotatably disposed within the stator core;
wherein:
the coils comprise at least a pair of U-phase coils, a pair of V-phase coils and a pair of W-phase coils;
one of the first and second electrical insulator assemblies has at least a pair of first notches, a pair of second notches and a pair of third notches that each extend radially through the outer wall of the one of the electrical insulator assemblies;
inclined surfaces are defined on an outer peripheral surface of the outer wall adjacent to each of the first, second and third notches on at least one of a first and second sides in a circumferential direction of the yoke;
an outer diameter of each of the inclined surfaces gradually decreases in a direction towards the respective notch such that the radial thickness of the outer wall gradually decreases toward each of the first, second and third notches along the respective inclined surface;
a first crossover wire electrically connecting the pair of U-phase coils extends from one of the U-phase coils, passes radially outward through one of the first notches, extends along the inclined surface adjacent to the one of the first notch, the outer peripheral surface of the one of the electrical insulator assemblies and the inclined surface adjacent to the other of the first notches, and passes radially inward through the other of the first notches to the other of the U-phase coils;
a second crossover wire electrically connecting the pair of V-phase coils extends from one of the V-phase coils, passes radially outward through one of the second notches, extends along the inclined surface adjacent to the one of the second notch, the outer peripheral surface of the one of the electrical insulator assemblies and the inclined surface adjacent to the other of the second notches, and passes radially inward through the other of the second notches to the other of the V-phase coils; and
a third crossover wire electrically connecting the pair of W-phase coils extends from one of the W-phase coils, passes radially outward through one of the third notches, extends along the inclined surface adjacent to the one of the third notch, the outer peripheral surface of the one of the electrical insulator assemblies and the inclined surface adjacent to the other of the third notches, and passes radially inward through the other of the third notches to the other of the W-phase coils.

18. The motor according to claim 17, wherein:
the first notches have a first circumferentially-extending surface that is disposed at a first axial depth from the stator core, the second notches have a second circumferentially-extending surface that is disposed at a second axial depth from the stator core, and the third notches have a third circumferentially-extending surface that is disposed at a third axial depth from the stator core, and
the first, second and third axial depths are different from each other.

19. The motor according to claim 18, wherein:
a first guide groove extends in the circumferential direction along the outer peripheral surface of the one of the first and second electrical insulator assemblies at the first axial depth, the first crossover wire being disposed in the first guide groove;
a second guide groove extends in the circumferential direction along the outer peripheral surface of the one of the first and second electrical insulator assemblies at the second axial depth, the second crossover wire being disposed in the second guide groove; and
a third guide groove extends in the circumferential direction along the outer peripheral surface of the one of the first and second electrical insulator assemblies at the third axial depth, the third crossover wire being disposed in the third guide groove.

20. A motor comprising:
a stator; and
a rotor that is rotatable relative to the stator;
the stator having a stator core, first and second electrical insulator assemblies and a stator winding,
the stator core having a yoke extending annularly around an axis of the stator core and a plurality of teeth extending radially inward from the yoke,
the first electrical insulator assembly being arranged on a first stator core end surface on a first side of the stator core in an axial direction and the second electrical insulator assembly being arranged on a second stator core end surface on a second side of the stator core in the axial direction,
each of the first electrical insulator assembly and the second electrical insulator assembly having an outer wall part extending in a circumferential direction and facing the yoke, and extending parts extending radially inward from the outer wall part such that the extending parts respectively face the teeth,
the stator winding having a plurality of phase windings,
each of the phase windings having a plurality of winding portions,
each of the winding portions having a winding part wound, in a state in which the first and second electrical insulator assemblies have been respectively disposed on the first and second stator core end surfaces in the axial direction, starting adjacent to the outer wall part of one of the first electrical insulator assembly and the second electrical insulator assembly, around one of the teeth of the stator core, and first and second wire extensions continuously extending from a first end and a second end of each of the winding parts, respectively, wherein:

the outer wall part of at least one of the first and second electrical insulator assemblies has a radial thickness and includes a plurality of notches extending radially therethrough, the notches being configured to guide the respective wire extensions between an inner peripheral surface and an outer peripheral surface of the outer wall part, the outer peripheral surface of the outer wall part has inclined surfaces that are adjacent to each of the notches on at least one of a first and second sides in a circumferential direction of the yoke, an outer diameter of each of the inclined surfaces gradually decreases such that the radial thickness of the outer wall part gradually decreases toward the respective notch along the inclined surface, at least one of the first wire extensions is a winding start wire, at least one of the second wire extensions is a winding end wire, and each of the second wire extensions of the winding parts except the winding end wire passes radially outward through one of the notches and along the inclined surface adjacent to the one of the notches, and each of the first wire extensions of the winding parts except the winding start wire passes radially outward through another one of the notches and along the inclined surface adjacent to the another one of the inclined notches.

* * * * *